Nov. 8, 1960 T. H. BONN 2,959,684

GATING CIRCUITS EMPLOYING MAGNETIC AMPLIFIERS

Filed Oct. 13, 1954

8 Sheets-Sheet 1

INVENTOR

THEODORE H. BONN

BY [signature]

ATTORNEY

Nov. 8, 1960 T. H. BONN 2,959,684

GATING CIRCUITS EMPLOYING MAGNETIC AMPLIFIERS

Filed Oct. 13, 1954 8 Sheets-Sheet 2

INVENTOR

THEODORE H. BONN

BY Sperry Sight

ATTORNEY

Nov. 8, 1960 T. H. BONN 2,959,684

GATING CIRCUITS EMPLOYING MAGNETIC AMPLIFIERS

Filed Oct. 13, 1954 8 Sheets-Sheet 3

INVENTOR

THEODORE H. BONN

BY Egery Light

ATTORNEY

INVENTOR
THEODORE H. BONN

BY Epery Light

ATTORNEY

INVENTOR

THEODORE H. BONN

BY Efrey Light

ATTORNEY

INVENTOR
THEODORE H. BONN

BY E. Jerry Light
ATTORNEY

GATING CIRCUITS EMPLOYING MAGNETIC AMPLIFIERS

Filed Oct. 13, 1954 8 Sheets-Sheet 7

INVENTOR

THEODORE H. BONN

BY Sperry Light

ATTORNEY

INVENTOR
THEODORE H. BONN
BY Sperry Light
ATTORNEY

United States Patent Office 2,959,684

Patented Nov. 8, 1960

2,959,684

GATING CIRCUITS EMPLOYING MAGNETIC AMPLIFIERS

Theodore H. Bonn, Philadelphia, Pa., assignor to Sperry Rand Corporation, a corporation of Delaware Filed Oct. 13, 1954, Ser. No. 461,968

39 Claims. (Cl. 307—88)

This invention relates to gating and buffing circuits, and more particularly to such circuits adapted for use as component parts of computing or data translating systems. Heretofore, gating circuits have employed diodes as the principal circuit components, but diodes are likely to fail and it is desirable to reduce the number of them required so far as possible. It is an object of the present invention to reduce the number of diodes required in a gating circuit and to replace some of the diodes with more reliable control devices.

A further disadvantage of conventional diode gating circuits is that they use a so-called constant current source which inherently consumes a large amount of power. It is an object of the present invention to provide a gating circuit that will reduce the power consumption required in the case of prior art gating circuits.

The principal object of this invention is to provide gating circuits adapted to act as the principal components of computing data translating systems.

Another object of this invention is to provide a gating system that is low in cost.

An additional object of the invention is to provide a gating circuit in which the component parts include saturable cores with coils thereon, whereby the advantage of that type of component is obtained.

Another object of this invention is to provide a gating circuit that is very efficient and effective in operation.

Other and more detailed objects and advantages of the invention will be apparent as the description thereof proceeds.

The present application utilizes saturable cores provided with coils so connected with the signal or control sources and with a source of power pulses that the power pulses are gated in accordance with information received from the signal sources. The invention involves detailed circuits for this purpose, these circuits being different depending on the particular application with which they are adapted for use. Typical detailed circuits are shown in several of the figures of the attached drawings. This specification also teaches how magnetic gating circuits may be interconnected to perform data translating functions.

The devices shown in this application may act either as magnetic gates or magnetic buffers. A magnetic gate is a device where predetermined similar conditions at all of the inputs will produce a given signal (or absence of a signal) at the output. A "buffer" is a device in which a predetermined signal (or absence of a signal) at any input will produce given output conditions. Since any of the forms of magnetic gates herein shown may be adapted to act as either a gate or a buffer, the term "gate" will be hereinafter used for purposes of simplicity to refer to both gates and buffers.

The present invention uses magnetic amplifiers of the general type described in the following two applications: Theodore H. Bonn and Robert D. Torrey, Serial No. 402,858, filed January 8, 1954, entitled "Signal Translating Device"; and John Presper Eckert, Jr. and Theodore H. Bonn, Serial No. 382,180, filed September 24, 1953, entitled "Signal Translating Device."

Figure 2:
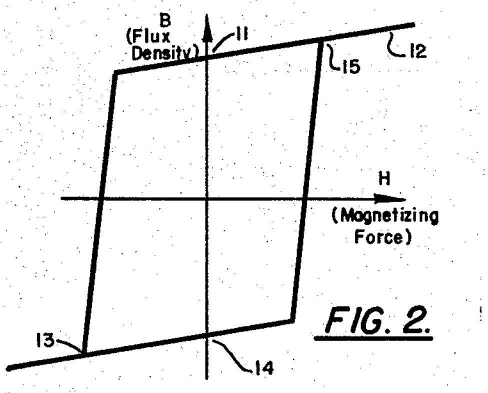
Figure 2 is a hysteresis loop for core material of the magnetic amplifiers.

In all the circuits and forms of the invention described herein the magnetic core can be made of a variety of materials, among which are the various types of ferrites and the various magnetic tapes, including Orthonik and 4–79 Molypermalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coil on the core will be high.

Figure 1:
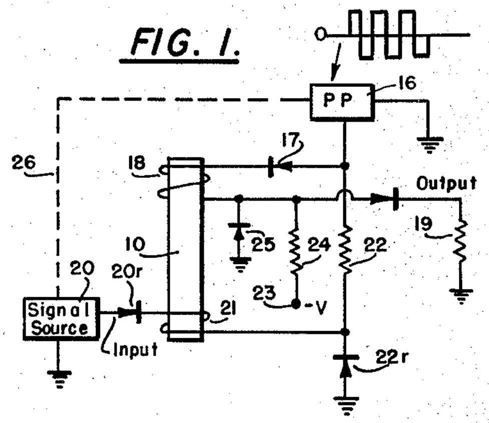
Figure 1 is a schematic diagram of one type of magnetic amplifier employed in connection with the invention.

Figure 1 illustrates a complementing magnetic amplifier which is now described in order to provide background information. In that figure, the source 16 of power pulses PP generates a train of equally spaced square wave positive power pulses having spaces therebetween substantially equal to the duration of the pulses. If it be assumed that at the beginning of any given positive power pulse the core has residual magnetism and flux density as represented by point 11 of the hysteresis loop of Figure 2, the next positive power pulse will drive the core from point 11 to point 12, which represents saturation. At the conclusion of the pulse the magnetizing force will return to point 11. Successive positive pulses from power source 16 will flow through rectifier 17, coil 18 and load 19, repeatedly driving the core from point 11 to point 12. During the interval in which the core is being driven from 11 to 12, the core is operating on a relatively saturated portion thereof, whereby the impedance of coil 18 is low. Hence, positive power pulses will flow from source 16 to load 19 without substantial impedance. If during the interval between the positive excursion of two power pulses, a pulse is produced at the input source 20, it may pass through coil 21, resistor 22, source 16, to ground. This will magnetize the core negatively driving it from point 11 to point 13. (This action is sometimes hereinafter referred to as "reverting" the core.) At the conclusion of this negative pulse the core will return to point 14 where the magnetizing force is zero. The next positive power pulse from source 16 is just sufficient to drive the core from point 14 to point 15. Since this is a relatively unsaturated portion of the core, the coil 18 will have high impedance during this pulse and the current flow will be very low. At the conclusion of that pulse the magnetization will return to zero value 11. If no signal appears on the input immediately following the last named power pulse, the next positive power pulse will drive the core to saturation at point 12 and will give a large output at the load 19.

Consequently, it is clear that the magnetic amplifier of Figure 1 will feed large pulses to the load in response to each pulse from source 16, except that immediately after the recipt of any pulse on the input 20 the next positive power pulse will be blocked.

In order to avoid appearance at the load 19 of the small so-called "sneak" current which flows during the period that a power pulse is driving the core from point 14 to point 15, the negative source 23, resistor 24 and rectifier 25 may be employed. Sufficient current flows through rectifier 25, resistor 24 and source 23 that the small "sneak" current from coil 18 to output 19 is cancelled.

Figure 3:
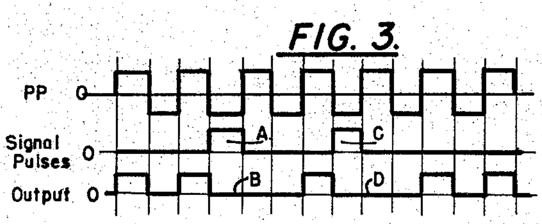
Figure 3 illustrates the wave forms of the signals involved in Figure 1.

In one form of the device, coil 18 has twice the number of turns as coil 21 and the source 16 has twice the electrical potential as the pulses on input 20. The source 16 of power pulses, and the signal source 20 are so synchronized by any suitable means 26, that the signal pulses always occur during the spaces between positive power pulses. As shown in Figure 3, the signal pulses A and C, as do all other signal pulses, occur at times when the power pulses PP are at zero or at negative values. It follows from the foregoing description of Figure 1 that there will be a continuous train of power pulses in the output except during those intervals B and D which immediately follow the signal pulses A and C.

The flow of positive power pulses from source 16 through the coil 18 when the latter has high impedance will tend to induce a potential in winding 21 during the positive power pulse period. The potential thus induced in winding 21 tends to cause a flow of current through input source 20, winding 21, resistor 22, source 16, to ground. This flow of current is undesirable and is blocked since the positive pulse of source 16 is impressed (through resistor 22) upon the cathodes of rectifiers 20*r* and 22*r*, whereby these rectifiers are cut off and will not allow flow of current in the circuit of winding 21.

The source 16 preferably goes negative during the space between positive power pulses; in other words, it preferably is a source of square wave alternating current. On the negative half cycle, the negative-going excursion of source 16 cuts off rectifier 17 and prevents flow of current from input 20 through rectifier 17 and coil 18 to the load.

In some of the magnetic amplifiers hereinafter described, the means 23, 24 and 25 for suppressing the "sneak" current has been omitted from the drawings and description, but could be added if desired.

The device of Figure 1, just described, per se is not part of the invention. It has been described primarily as background information and secondarily since the circuit of Figure 1 is incorporated as a component part of some of the more complex circuits hereinafter described. The device of Figure 4, now to be described, embodies a basic and important concept and constitutes one form of the invention.

Figure 4:
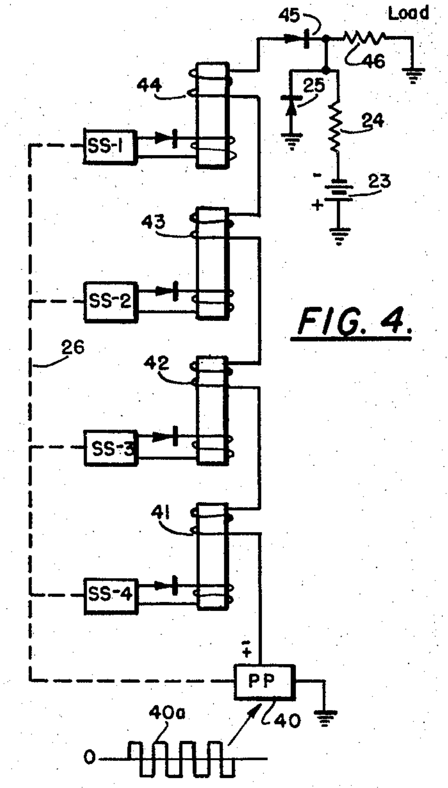
Figure 4 is a schematic diagram of a series gating or buffing circuit in which a predetermined signal on any one of the signal sources will block current to the load.

In Figure 4 the source 40 of power pulses produces an alternating current square wave potential 40*a*. Source 40 is preferably a constant potential source, that is one of good voltage regulation, whereby its potential is constant even though the load current varies. Current from source 40 tends to flow through coils 41, 42, 43 and 44, rectifier 45 and load 46. Current can flow through the aforesaid path only if at the start of any given positive power pulse the cores are all at point 11 (see Figure 2) on their respective hysteresis loops. In such case, the positive power pulse will flow through the aforesaid coils and produce a positive pulse at the load 46. However, if any one or more of the signal sources SS–1 to SS–4 inclusive have, during a period immediately preceding that of a given positive power pulse, produced a signal, such signal will revert its complementary core from point 11 to point 13. At the conclusion of such signal the magnetization of the core will return to the zero value 14. The next power pulse passing through the coil on that core will drive the core from point 14 to point 15 on the hysteresis loop, wherefore the coil has high impedance and very little current will flow through it, hence in that case only a small current will pass through the load 46. The operation of Figure 4 may be summarized by stating that in the absence of signals on all of the sources SS–1 to SS–4 inclusive, the positive pulses from source 40 will flow to load 46. However, no pulse will flow to the load 46 when, immediately prior thereto, a signal was produced by any one or more of the signal sources SS–1 to SS–4 inclusive.

Within the very broadest aspects of the invention of Figure 4, it is not important to consider the necessity of any means 26 for synchronizing the pulses from sources SS–1 to SS–4 or to insure that the pulses from those sources are synchronized to occur only during spaces between positive pulses of source 40. In a practical computer or data translating system employing the invention, there would be a complete circuit which would insure that pulses were emitted from sources SS-1 to SS-4 only during gaps between positive pulses of source 40; but so far as the very broadest aspects of the invention are concerned this is not required. Sources SS-1 to SS-4 could in fact be pulse generators that generated pulses at random times. If, during any gap between two pulses of source 40 any one of the random pulses occurred and reverted the core, the next power pulse from source 40 would be blocked.

In Figure 4, a "sneak" suppressor may be used or omitted as desired. Battery 23, resistor 24 and rectifier 25, which correspond in construction and mode of operation to similar parts of Figure 1 may be employed to cancel "sneak" currents.

Another design consideration in connection with Figure 4 concerns the waveform **40*a* of source 40. If all four signal sources SS-1 to SS-4 inclusive emit a signal simultaneously, they will induce potentials in all four coils 41 to 44 inclusive. In the absence of means to prevent the same, these potentials might include surges that were of proper polarity as to pass through rectifier 45 to the load. To prevent any such unwanted currents at the load, the source 40 has a waveform 40*a* that goes so highly negative (during the spaces between positive power pulses) that the maximum surges in coils 41 to 44 inclusive, if added together, are more than cancelled by the negative pulses of waveform 40*a*. Hence, during the spaces between positive power pulses of source 40, the algebraic sum of the potential of source 40 plus the potentials of coils 41 to 44 always renders the anode of rectifier 45 negative. Therefore, no current flows to the load during the spaces between positive pulses of source 40**.

In all forms of the invention there is preferably a rectifier, such as 45, in the output circuit. Not only does such a rectifier enable the load to be disconnected from the source 40 during the spaces between positive going pulses of source 40 but it enables the relative values of the potential of source 40, the size of the cores, the windings on the cores, etc., to be so selected that there is a large gain of both power and energy at the load compared to the power and energy of signal sources SS-1 to SS-4 inclusive. Without the rectifier 45 it would not be possible to secure power gain at the load.

Figure 4A:
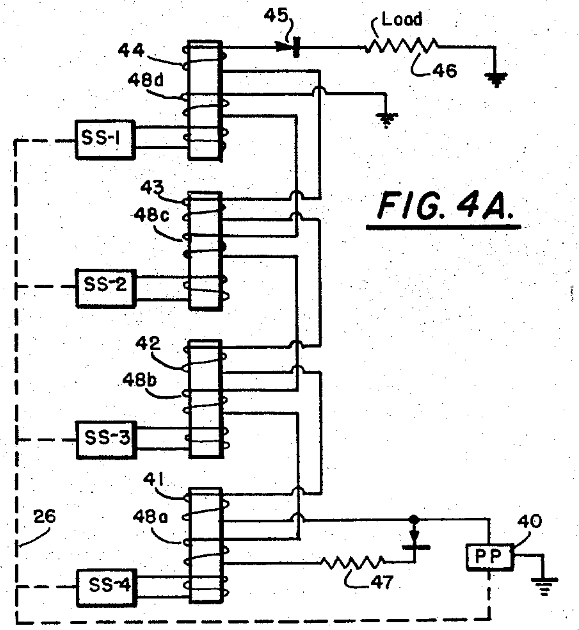
Figure 4A is a modified form of Figure 4 showing alternate means for suppressing sneak currents.

Figure 4A is identical with Figure 4 in every respect except for the means for suppressing sneak currents. In Figure 4A there are, on the cores, additional coils **48*a* to 48*d* inclusive, respectively so wound as to induce into coils 41 to 44 enough potential as to cancel any sneak currents tending to flow. Coils 48*a* to 48*d* are in series with resistor 47 the resistance of which is so high that the current flowing through coils 48*a* to 48*d*** is essentially constant irrespective of the impedances of those coils.

It is further understood that in some practical applications of the novel gating circuits herein disclosed, "sneak" currents in the output are not objectionable, hence in such situations no means for cancelling them are required.

For definition purposes, each core with its two coils, in Figure 4, is regarded as a "magnetic amplifier." This term as applied to later figures refers to a saturable core together with all of the coils thereon.

In view of the fact that these magnetic gating circuits are based upon magnetic amplifiers that may be operated in such a way as to obtain power gain, the output of a gate may operate more than one core identical to or larger than the gate cores if desired.

Figure 5:
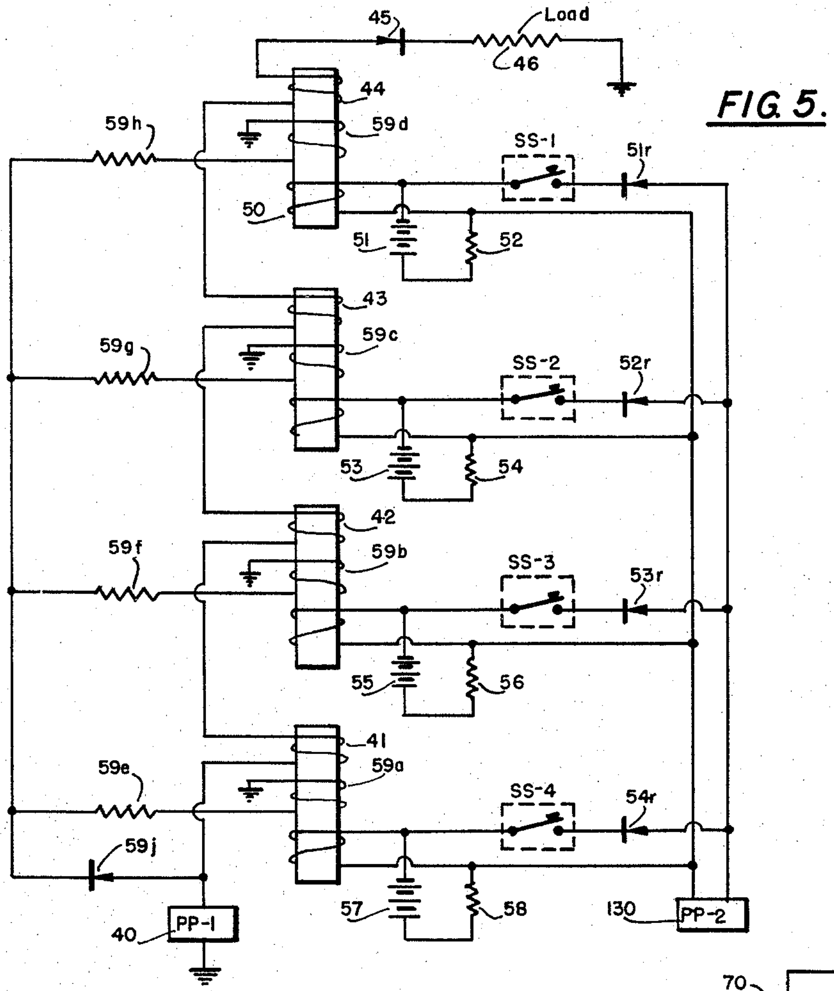
Figure 5 is a modified form of Figure 4 in which all four signal sources must produce control signals simultaneously in order to enable a flow of current to the load.
Figures 6, 8, 10:
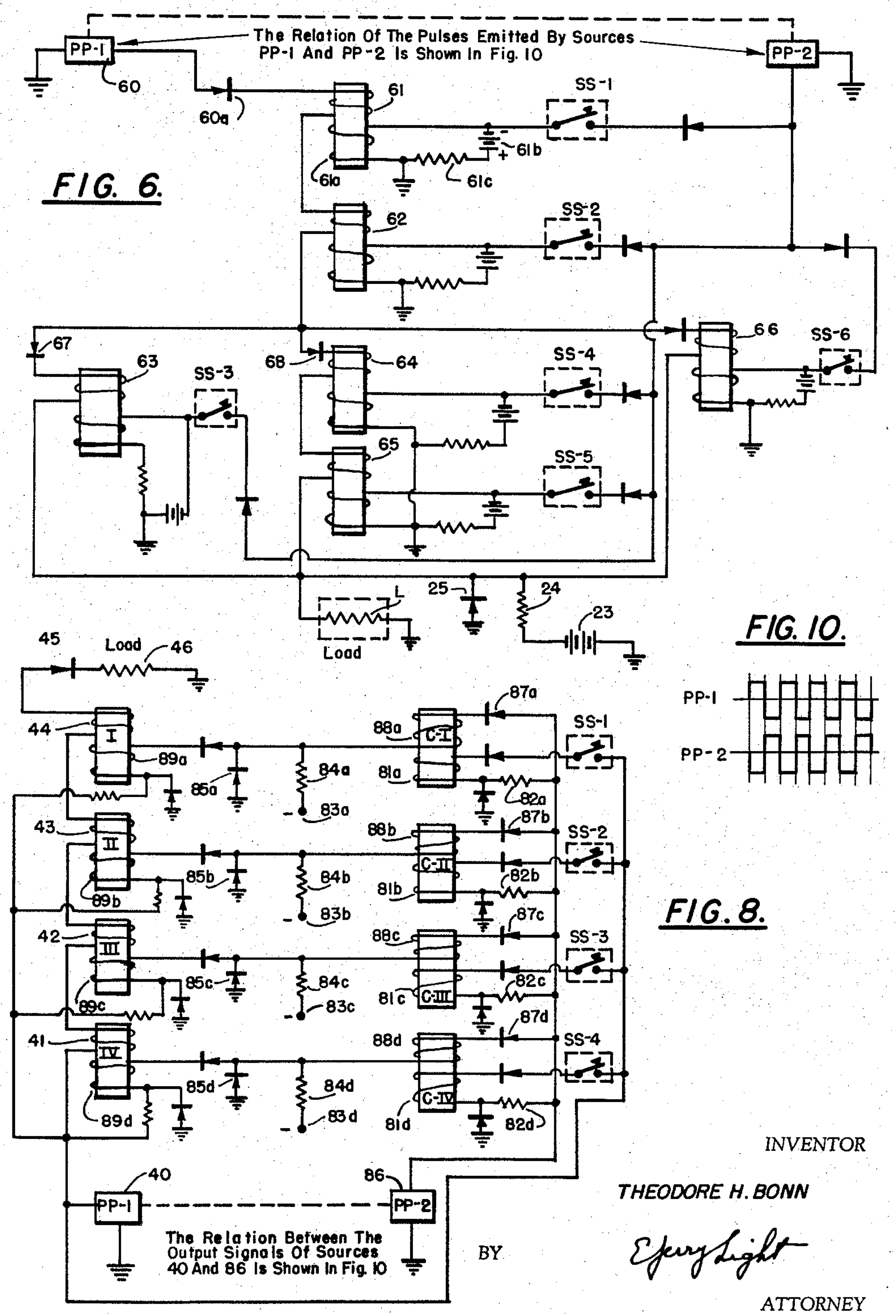
Figure 6 is a schematic diagram of another modified form of the invention.
Figure 8 is a schematic diagram of the device of Figure 4 having complementing magnetic amplifiers inserted between the signal sources and the inputs to the control magnetic amplifiers in order to reverse the effect of the signal sources.
Figure 10 is a waveform diagram showing the relative waveforms of the sources of power pulses PP–1 and PP–2 in Figures 5, 6, 8 and 15.

Figure 5 illustrates certain improvements over the device of Figure 4. Like reference numbers on Figures 4 and 5 represent similar parts. In connection with Figure 5, the batteries and resistors 51 to 58 inclusive may be omitted and the device will first be discussed with that assumption. The pulse generators 40 and 130 have waveforms as shown in Figure 10; that is the positive pulses of each source occur simultaneously with the negative pulses of the other source. In view of rectifiers **51*r* to 54*r* the source 130 feeds only positive pulses to the signal sources (in this case switches) SS-1 to SS-4 inclusive, hence it is clear that the control pulses of signal sources SS-1 to SS-4 inclusive must always appear during the spaces between pulses of source 40**.

If batteries and resistors 51 to 58 inclusive are all omitted and the associated coils such as 50 are reversed in the sense of their winding, it is clear that the device of Figure 5 will have no current in load 46 if any one of the switches SS-1 to SS-4 inclusive is closed, for then positive pulses from source 130 will flow through the switch which is closed, to its associated coil (for example coil 50), and revert the core during the spaces between pulses from source 40. Therefore, coil 44 (for example) will have high impedance to power pulses from source 40.

On the other hand, if batteries and resistors 51 to 58 inclusive are employed the operation will be modified. Assuming all switches SS-1 to SS-4 inclusive are open, the battery 51 will pass current through coil 50 and resistor 52 and drive the core toward negative saturation (for example to point 13 on the hysteresis loop of Figure 2) during the spaces between positive power pulses. Hence, the coils 41 to 44 will all have high impedance to the flow of positive power pulses toward load 46. Closing of switch SS-1 will cause a pulse to flow from source 130 which will cancel the reverting current due to battery 51, and thus enable coil 44 to readily allow the next positive pulse from source 40 to pass therethrough. However, all four switches SS-1 to SS-4 must be simultaneously closed before all four coils 41 to 44 inclusive have low impedance. Hence, the device of Figure 5 with the sense of windings such as 50 reversed without batteries and resistors 51 to 58 will have a pulsed output at the load only if all four switches SS-1 to SS-4 are open. Closing any one switch stops flow of current to the load. With the batteries and resistors 51 to 58 inclusive, all four switches must be closed before current will flow to the load and the opening of any one switch will stop the load current. In an actual circuit it is clear that one or more of batteries 51, 53, 55 and 57 may be omitted and those skilled in the art can readily see a number of possibilities in this regard, in view of the above discussion.

Preferably, the number of volt-seconds of potential of source 40 considered along with the number of turns on the coils 41 to 44 inclusive should be such that if three of the coils have low impedance (their cores at point 11 of Figure 2) and the fourth coil has high impedance (point 14 of Figure 2) at the start of any given positive power pulse, that pulse will be just sufficient to drive the core of said fourth coil from point 14 to point 15 of Figure 2. If this preferred relationship is employed in Figure 4, the number of volt-seconds will be insufficient to drive two or more cores from point 14 to point 15 in event more than one core stands at point 14 at the beginning of any given positive power pulse. To overcome this difficulty and to enable preferred operation to be realized, additional coils **59*a* to 59*d* inclusive along with resistors 59*e* to 59*h* and rectifier 59*j* may be added to Figure 5. The resistors 59*e* to 59*h* have such high resistances that essentially constant current flows through them even though the impedances of coils 59*a* to 59*d* may vary. The current flow through each of coils 59*a* to 59*d* is so selected that (in the absence of other magnetomotive forces on the core) it will tend to drive its respective core from point 14 to point 15 (of Figure 2) during the time period required for a single power pulse. In this situation, even if all the cores are at point 14 (of Figure 2) at the start of a given power pulse, they will all be driven to point 15 by the coils 59*a* to 59*d*, even if insufficient current flows in the other coils. If none of these cores are reverted during the spaces between positive power pulses of source 40, the next power pulse from that source will find all four coils 41 to 44** inclusive with low impedance whereby current will flow to the load.

It is noted that during the spaces between positive power pulses of source 40, the battery 51 forces enough current through coil 50 to revert the core from point 11 to point 13 of Figure 2; and the current supplied through switch SS–1 when it is closed is just sufficient to cancel the effect of battery 51. Similar relationships apply to the other cores.

It is further understood that extra coils and resistors, the equivalent of coils 59*a* to 59*d* and resistors 59*e* to 59*h*, could be added to any of the cores of any of the several forms of the invention disclosed in this application and that they would normally be used. However, to simplify the description they are not shown, other than in Figures 5 and 11, although it should normally be assumed that such coils and resistors are included in each of the gating circuits of this application.

It may also be noted that, instead of connecting coils 59*a*, 59*b*, 59*c*, and 59*d* as shown, they could be connected in series, the series circuit having high resistance. In fact the series circuit 47, 48*a*, 48*b*, 48*c* and 48*d* of Figure 4A could be used to serve the same purpose as described in connection with coils 59*a* to 59*d* of Figure 5. Moreover, either the series arrangement of coils 48*a* to 48*d* of Figure 4A or the parallel arrangement of coils 59*a* to 59*d* inclusive of Figure 5 could be used to cancel "sneak" currents as well as to reset the cores to point 15. That is to say, in Figure 4A the resistance of resistor 47 may be so selected that the coils 48*a* to 48*d* not only cancel sneak currents but reset the cores from point 14 to point 15 on their respective hysteresis loops, of Figure 2. Likewise coils 59*a* to 59*d* of Figure 5 could remain as shown in that figure and by properly selecting the values of resistance of resistors 59*e* to 59*h* the coils could not only reset the cores from points 14 to 15 but also cancel sneak currents.

Figure 6 illustrates a series-parallel type of device in which certain of the power windings of the magnetic amplifiers are in parallel with each other, and all of the coils are effectively in series with the load when they have high impedance. The source of power pulses 60 tends to drive positive power pulses through the rectifier 60*a* and through power windings 61 and 62. In series with the two coils 61 and 62 is a circuit having three branches in parallel. The first branch includes power winding 63. The second branch includes power windings 64 and 65 in series with each other. The third branch includes power winding 66. In order for substantial current to flow from source 60 to the load L, there must be a low impedance path directly connecting source 60 to the load. There can be a low impedance path only if coils 61 and 62, which are in series with the source 60, have low impedance. However, that is not the only requirement for a complete low impedance path from the source 60 to the load L. In addition, one of the three branches of the parallel circuit must have low impedance. The first branch may have low impedance if the coil 63 has low impedance. In order for the second branch to have low impedance, both coils 64 and 65 must have low impedance. In order for the third branch to have low impedance, it is merely necessary for power winding 66 to have low impedance.

The power coils 61 and 66 inclusive are all coils similar to coil 18 of Figure 1. Each one of these coils is a part of a magnetic amplifier broadly similar to that of Figure 1, and accordingly there is a control winding on each one of the magnetic amplifiers corresponding to control winding 21 of Figure 1. The control winding 61*a* controlling coil 61 is connected to source of pulses SS–1. Battery 61*b* and resistor 61*c* tend to revert the core to point 13 in its hysteresis loop (Figure 2) during the spaces between positive pulses of source 60. If switch SS–1 is closed, pulses from source PP–2 (occurring during the gaps between pulses of source PP–1) will cancel the reverting effect of the battery 61*b* and thus allow the coil 61 to have low impedance. The cores, control windings, resistors, batteries and switches (SS–2 to SS–6 inclusive) associated with coils 62 and 66 inclusive are all similar in construction and mode of operation to the similar parts 61*a*, 61*b*, 61*c* and SS–1 associated with coil 61. Thus, if any one of switches SS–1 to SS–6 inclusive is closed, its associated coil 61 to 66, as the case may be, will have low impedance to the next positive power pulse.

There will be a low impedance path from source 60 to the load L, if sources SS–1, SS–2 and SS–3 all pass a pulse at the same time (during a period between two of the power pulses of source 60). There will likewise be a positive pulse fed from source 60 to the load L if all of pulse sources SS–1, SS–2, SS–4 and SS–5 concurrently apply pulses to their respective control windings during the space between two of the power pulses emitted by source 60. Likewise, there will be a power pulse fed from source 60 to the load in event all of signal sources SS–1, SS–2 and SS–6 concurrently emit a signal pulse to their respective control windings during a period between two of the power pulses of source 60. Unless one of those three conditions just enumerated is met, no pulse will be fed from the source 60 to the load L. For example, if any combination of signal sources, not including signal source SS–1, emits concurrent pulses, no current will flow from source 60 to the load, inasmuch as coil 61 will in that circumstance have high impedance. Likewise, if signal source SS–2 is not included in the combination of sources which emit concurrent pulses, there will be no flow of current to the load. Even though signal sources SS–1, SS–2 and SS–4 should concurrently emit a signal pulse during a period when sources SS–3, SS–5 and SS–6 are not emitting signal pulses, there will be no flow of current to the load, as under these conditions the coils 63, 65 and 66 would all have high impedance and no current could flow through any one of the three parallel branches to the load. Therefore, the device of Figure 6 is a gating circuit having certain power windings in series and others in parallel, and in which certain ones of the whole group must be energized before current can flow to the load.

Battery 23, resistor 24 and rectifier 25 may be added (if desired) to the device of Figure 6, to cancel "sneak" currents, the same as described in connection with Figures 1 and 4.

Figure 7:
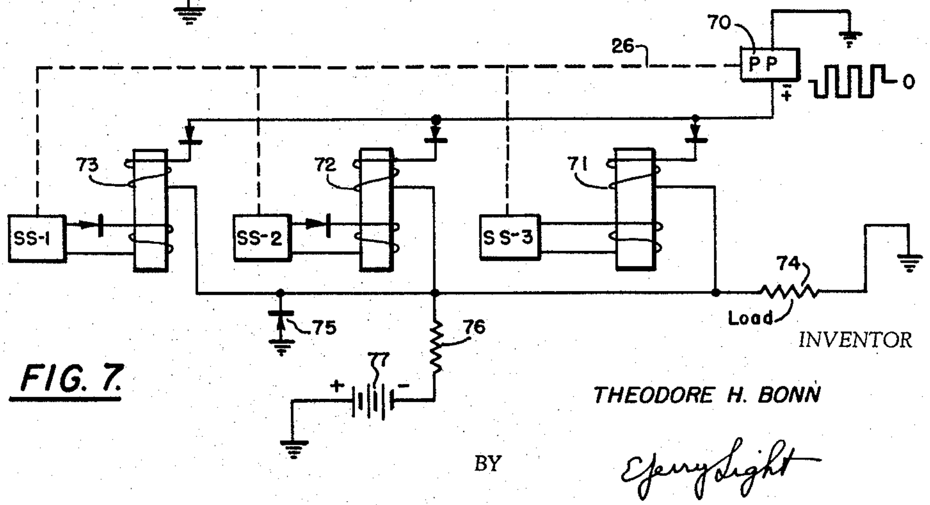
Figure 7 is a schematic diagram of yet another modified form of the invention.

Figure 7 is a parallel coincidence type of gating circuit in which all of the signal sources must produce a signal pulse simultaneously in order to block flow of current from source 70 to the load 74. The source 70 (of the constant potential type like source 60 of Figure 6) may produce the usual square wave alternating current as shown. If any one of the cores is at point 11 on its hysteresis loop at the beginning of a positive power pulse, the coil on that core will have low impedance during the continuance of the positive pulse and will allow current to flow to the load 74. On the other hand, if prior to any given positive pulse from source 70, all of signal sources SS–1 to SS–3 inclusive, have produced pulses which flip their respective cores from point 11 to point 13, those cores will return to zero magnetization point 14 at the conclusion of these signal pulses. The next positive power pulse from source 70 will encounter high impedance in all three coils 71, 72 and 73, hence very little current will flow to the load. That pulse will flip the core from point 14 to point 15 and it will return to zero magnetizing force point 11, at the conclusion of that pulse. Hence, the apparatus is in condition for the next signal input. Coils such as 59*a* to 59*d* and resistors such as 59*e* to 59*h* of Figure 5 are rarely necessary in devices such as shown in Figure 7 where all power windings are in parallel with each other.

Figure 12:
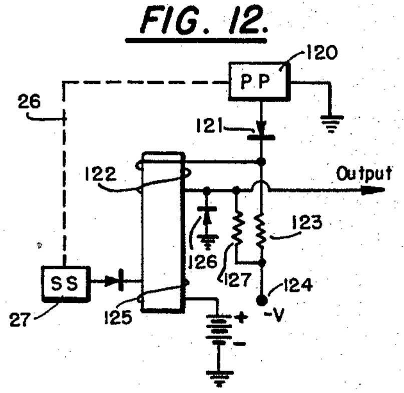
Figure 12 is a schematic diagram of a non-complementing magnetic amplifier, useful in explaining the circuit of Figure 13.

The rectifier 75, resistor 76 and the battery 77 cancel "sneak" currents which would otherwise appear at the load 74, in the same way that the "sneak" currents are cancelled in Figure 1 by the parts 23, 24 and 25, as well as in the same way that "sneak" currents are eliminated in Figure 12 by the parts 123, 124, 126, and 127. Coils such as 59_a_ to 59_d_ inclusive of Figure 5 or coils such as 48_a_ to 48_d_ inclusive of Figure 4A could be used in Figure 7 to suppress "sneak" current in the place of parts 75 to 77 inclusive.

Figures 4 and 7 show the signal sources (SS–1, etc.) connected directly to the control windings. Figure 5 illustrates in more detail how these signal sources may control spaced pulses from a second pulse source PP–2; and also how the cores may be reverted by batteries 51, 53, 55 and 57 so that the core has low impedance only when the switch (SS–1, etc) is closed. All of these arrangements illustrated in connection with Figure 5 may be applied to Figure 7. In such a situation, namely, with a core having low impedance only when its associated switch is closed current from source 70 will flow to load 74 if at least one of the switches SS–1 to SS–3 is closed.

Summarizing the devices of Figures 4 to 7 inclusive, it is noted that in all of these figures the source of power pulses is directly in series with the load and with one or more coils of the magnetic amplifiers. This I call a "series-load coincidence type of magnetic gating circuit." It is distinguished from the "parallel-load coincidence type" magnetic gate in that in the latter type the source of power pulses and the load are in parallel with each other, as well as in parallel with the coils of the magnetic amplifier. In the latter type of device the coils when they acquire low impedance, form a short circuit across the load and prevent any current from flowing from the source of power pulses to the load. The series load coincidence type of device, which is shown in Figures 4 to 7 inclusive, have the advantage over the parallel type in that the number of diodes employed may be reduced. The broad category of the series-load coincidence type magnetic gating circuit may be broken down into three classes, all of which have been heretofore illustrated and which are:

(1) The series coil input device is shown in Figures 4 and 5. In these devices the several power windings of the magnetic amplifiers are in series with the load.

(2) The parallel coil input type of device is shown in Figure 7. Here, the series circuit from the source to the load has several parallel branches, with each branch containing at least one power winding each in series with the load. If any one of these branches has low impedance current will flow to the load.

(3) The series-parallel input type of device is illustrated in Figure 6. There certain of the power windings are directly in series with the load and others form parallel branches each in series with the load. In this situation all of those power windings which are directly in series with the source of power pulses must concurrently have low impedance and in addition at least one of the parallel branches must have low impedance before current will flow to the load. It is noted that the series-parallel type of device can be expanded indefinitely, having any number of branch circuits in the parallel portion of the circuit, and these several branches may in turn each have coils in series with each other, or in parallel with each other. Moreover, there may be series-parallel branches within a given branch.

Having above described the basic concepts upon which the invention rests, a number of variations will now be pointed out in order to aid those skilled in the art in applying the basic principles hereinabove laid down to different situations which may be encountered. One modification which is sometimes desirable in devices of this character is to have the output energized when there is a signal present on any given plurality of input terminals. To explain this in greater detail, it is noted that in Figure 5 an output appears at the load in event all of the signal sources SS–1 to SS–4 inclusive are concurrently energized. Two alternate modifications of Figure 4, which produce output at the load only if all inputs are energized, will now be described.

Figure 8 is a schematic diagram of the device of Figure 4 in which like reference numbers include like parts, except that complementing magnetic amplifiers C–I to C–IV inclusive, have been inserted between the signal sources of SS–1 and SS–4 inclusive and their associated primary windings on the magnetic amplifiers. For example, the signal source SS–1 is represented by a switch in series with a source 40. It feeds the primary or input winding 81_a_ of the complementing magnetic amplifier C–I, and the output winding 88_a_ of the magnetic amplifier C–I feeds the input winding 89_a_ of the magnetic amplifier I which controls the load. The four complementing magnetic amplifiers C–I to C–IV inclusive, which are connected between the switches (SS–1, SS–2, SS–3 and SS–4) and the coils (89_a_ to 89_d_ inclusive), are all identical with the complementing magnetic amplifier of Figure 1. They are also identical with each other and bear like reference numbers, except that the subscripts are different. The complementing magnetic amplifier C–I, associated with switch SS–1, has its parts bearing subscript _a_. Corresponding parts on the magnetic amplifier C–II bear corresponding reference numbers but with the subscript _b_. Corresponding parts of the magnetic amplifier C–III carry subscript _c_, and the parts associated with the magnetic amplifier C–IV carry subscript _d_. The parts of Figure 8 bearing reference numbers 87_a_ to 87_d_ inclusive correspond to rectifier 17 of Figure 1. The parts bearing reference numbers 82_a_ to 82_d_ inclusive of Figure 8 correspond to resistor 22 of Figure 1. Negative sources 83_a_ to 83_d_ inclusive of Figure 8 correspond to negative source 23 of Figure 1. Rectifiers 85_a_ to 85_d_ inclusive of Figure 8 correspond to rectifier 25 of Figure 1. Input windings 81_a_ to 81_d_ inclusive of Figure 8 correspond to input winding 21 of Figure 1. Output windings 88_a_ to 88_d_ inclusive of Figure 8 correspond to output windings 18 of Figure 1. Resistors 84_a_ to 84_d_ inclusive of Figure 8 correspond to resistor 24 of Figure 1. The coils 89_a_ to 89_d_ inclusive of Figure 8 correspond to the load 19 of Figure 1. In order to understand the operation of Figure 8, let it be assumed that signal sources SS–1 to SS–4 inclusive are merely single pole, single throw switches in series with the source 40. Assuming that these switches are all closed, current will flow from source 40 through switch SS–1, coil 81_a_, resistor 82_a_, through source 86 to ground. This will revert the core by which coil 81_a_ is wound, and the next power pulse from source 86 will meet high impedance at coil 88_a_. Likewise, coils 88_b_, 88_c_ and 88_d_ will all have high impedance and no pluses will flow from source 86 to the coils 89_a_ to 89_d_ inclusive. Hence, none of the cores containing coils 41 to 44 inclusive will be reverted during the spaces between pulses of source 40 and the next power pulse from source 40 will meet low impedance in all four coils 41 to 44 inclusive and will flow to the load. As long as the switches SS–1 to SS–4 inclusive all remain closed, the power pulses from source 40 will flow to the load 46 without substantial impedance. If, however, it be assumed that any one of the switches SS–1 to SS–4 inclusive is opened, there will be a high impedance in series with the load 46 as follows. Assuming that switch SS–1 is opened, no current from source 40 will flow to the coil 81_a_. Therefore, the core by which that coil is wound will not be reverted during the spaces between pulses of source 40, and the next power pulse from source 86 will flow through the coil 88_a_ and the coil 89_a_ reverting the core containing the coil 44. This reverting will take place during the spaces between pulses of source 40, since as stated above, the source 86 emits its positive pulses during the time period between the positive pulses of source 40. Hence, the upper core will be reverted during the spaces between power pulses of source 40, and the next pulse from source 40 will meet high impedance in the coil 44 and little if any current will flow to the load 46.

Figures 9, 11:
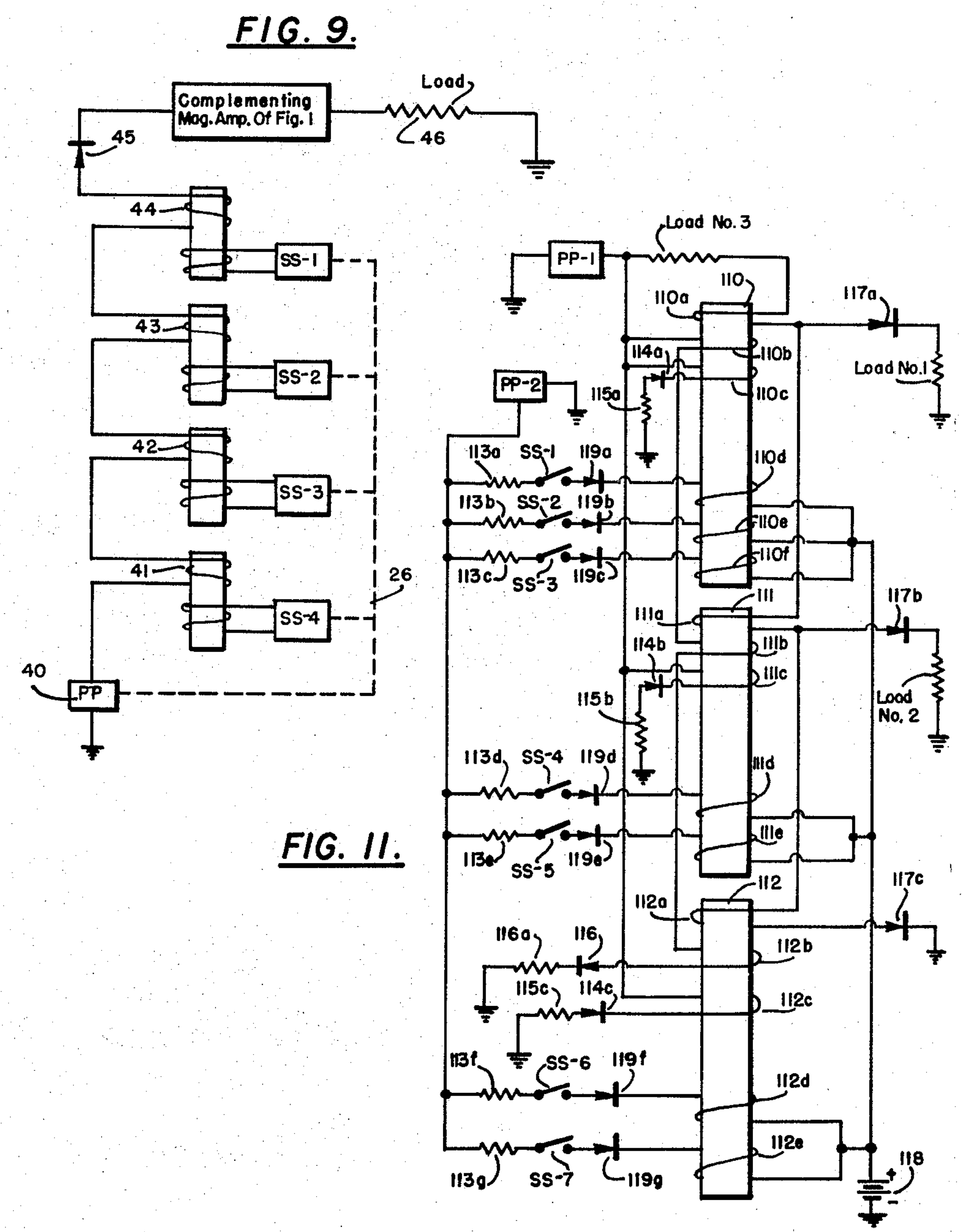
Figure 9 is a schematic diagram of Figure 4 with a complementing magnetic amplifier in series with the load in order to reverse the effect of the device upon the load.
Figure 11 is a schematic diagram of a modified form of the invention.

Figure 9 is a modified showing of Figure 4 in which the complementing magnetic amplifier 90 is placed in series with the load 46. Otherwise, the circuit is exactly identical with the circuit of Figure 4. In the device of Figure 9, if any one or more of the signal sources SS–1 to SS–4 inclusive does have a signal pulse at its input, there will be no input to the complementing magnetic amplifier 90, and consequently the latter will produce an output pulse at the load 46.

In Figure 11 there are sources of alternating current power pulses PP–1 and PP–2 having waveforms as shown in Figure 10, and three outputs respectively entitled "Load 1," "Load 2," and "Load 3." As will hereinafter appear, various energizations of the seven different signal sources will cause the outputs to have predetermined energizations.

The cores 110, 111 and 112 are similar to the core 10 of Figure 1. The several signal sources SS–1 to SS–7 inclusive may be switches which control positive pulses from source PP–2 and have resistors 113*a* to 113*g* respectively in series with them in order that the currents may be predetermined. Reverting currents for reverting the cores are passed through coils 110*c*, 111*c* and 112*c*. The rectifiers 114*a*, 114*b* and 114*c* insure that the reverting currents flow only during negative half cycles of source PP–1. The strength of the reverting currents are predetermined by resistors 115*a*, 115*b* and 115*c*. On the positive halves of the cycles of source PP–1, current flows through power windings 110*b*, 111*b* and 112*b*, the rectifier 116 and the resistor 116*a*. Rectifiers 117*a*, 117*b* and 117*c* insure that the current flow in output coils 110*a*, 111*a* and 112*a* is always in one direction. Battery 118 provides positive potential that blocks the cathodes of rectifiers 119*a* to 119*g* inclusive during reversion in the absence of positive potentials on the anodes of these rectifiers.

On positive halves of the cycles of source PP–1 current flows from source PP–1, coils 110*b*, 111*b*, 112*b*, rectifier 116 and resistor 116*a*. This current serves the same purpose as those flowing through coils 59*a* to 59*d* inclusive of Figure 5. In view of resistor 116*a* the current in coils 110*b*, 111*b* and 112*b* is practically constant even though the impedances of the coils may vary. The current flow through each of coils 110*b*, 111*b* and 112*b* is so selected that (in the absence of other magnetizing forces in the core) it will tend to drive its respective core from point 14 to point 15 (of Figure 2) during the time period required for a single power pulse. In this situation, even if all the cores are at point 14 (of Figure 2) at the start of a given power pulse, they will be driven to point 15 even if all of coils 110*a*, 111*a* and 112*a* have high impedance. In other words, due to windings 110*b*, 111*b* and 112*b*, all cores will be at points 15 on their respective hysteresis loops at the end of each positive power pulse of source PP–1 so that unless the cores are reverted prior to the next positive power pulse, the latter will find low impedance at all of coils 110*a*, 111*a* and 112*a* and will drive all three cores to saturation.

The operations whereby the cores are reverted will now be explained. The value of resistor 115*a* is so selected that during the negative excursions of source PP–1 sufficient current flows through coil 110*c* that the magnetizing force thereby produced in the core 110 is three times that necessary to drive the core from point 11 to point 13 of Figure 2. Each one of resistors 113*a*, 113*b* and 113*c* has a value of resistance selected whereby when its complementary switch SS–1 to SS–3 inclusive, as the case may be, is closed, a current will flow through the complementary coil 110*d* to 110*f* inclusive which will produce a magnetizing force opposing that due to the current in coil 110*c*; however, the magnitude of the currents in coils 110*d* to 110*f* inclusive is such that the magnetizing force produced by each coil is only one-third of that produced by coil 110*c*. In other words, if all three switches SS–1 to SS–3 inclusive are simultaneously closed, all three coils 110*d* to 110*f* inclusive will be energized and the magnetizing force produced by the three coils combined will be equal and opposite to the flux produced by coil 110*c*. On the other hand, if only two of the three switches SS–1 to SS–3 inclusive are closed, only two of the coils 110*d* to 110*f* inclusive will be energized and only two-thirds of the magnetizing force of coil 110*c* will be cancelled and therefore there will be sufficient negative magnetizing force produced by the coil 110*c* to revert the core from point 11 to point 13 of Figure 2. Consequently, it is necessary that all three switches SS–1 to SS–3 inclusive be closed in order to prevent coil 110*c* from reverting the core during negative excursions of source PP–1. If less than all three switches SS–1 to SS–3 inclusive are closed, the core will be reverted by negative excursions of source PP–1. While, for purposes of illustration, three signal sources SS–1 to SS–3 inclusive have been shown, it is understood that any number thereof could be employed and various modifications and arrangements are possible. For example, four signal sources could be employed to control four coils on core 110 with the requirement that at least three of the four switches be closed in order to prevent reversion of the core. As a further example, it might be arranged that switch SS–1 when closed would provide sufficient counter-magnetizing force to cancel that of coil 110*c*, while if that switch was open and it was still desired to prevent reversion of the core, switches SS–2 and SS–3 must both be closed in order to produce sufficient flux to cancel the reverting effect of coil 110*c*.

In connection with core 111, the resistor 115*b* has such value that during negative excursions of source PP–1 the current which will flow through coil 111*c* is twice that necessary to drive the core from point 11 to point 13 of Figure 2. In addition, the resistors 113*d* and 113*e* have such values that the currents flowing in coils 111*d* and 111*e* will jointly produce sufficient flux to exactly cancel that of coil 111*c*. In other words, if either of switches SS–4 or SS–5 alone is closed, a magnetizing force will be produced counter to that of coil 111*c* but of only half the magnitude and therefore there will be sufficient reverting flux due to core 111*c* to drive the core from point 11 to point 13.

Coil 112*c* has its current controlled by resistor 115*c* during the negative excursions of source PP–1, the current being double that required to revert the core from point 11 to point 13 of Figure 2. Each switch SS–6 and SS–7 when closed furnishes sufficient current to its complementary coil 112*d* or 112*e*, as the case may be, to produce half the magnetizing force which is produced by coil 112*c* so that if either of switches SS–6 or SS–7 is closed and the other is open, the magnetizing force produced by coil 112*c* will revert the core; whereas if both switches SS–6 and SS–7 are closed, the reverting effect of coil 112*c* will be exactly cancelled.

The circuits for the three loads, Load 1, Load 2 and Load 3 will now be explained. Load 3 is in series with source PP–1 and coil 110*a*, so that as long as that coil has high impedance no substantial current will flow through Load 3. When coil 110*a* has low impedance, a current may flow through Load 3 on positive halves of the cycle through one of two paths. If either of coils 111*a* or 112*a* has high impedance while coil 110*a* has low impedance, current will then flow from source PP–1, Load 3, coil 110*a*, rectifier 117*a*, Load 1 to ground. On the other hand, if all three coils 110*a*, 111*a* and 112*a* have low impedance, the flow of current will take the following path: Source PP–1, Load 3, coil 110*a*, coil 111*a*, coil 112*a*, rectifier 117*c*, to ground. Two conditions must be met in order for current to appear at Load 1. First, coil 110*a* must have low impedance, and secondly, one or the other of coils 111*a* and 112*a* must have high impedance. Under these circumstances current flows from source PP–1, Load 3, coil 110*a*, rectifier 117*a*, Load 1, to ground. In order to have current in Load 2, it is also necessary for two conditions to be met. Coils 110*a* and 111*a* must both have low impedance and coil 112*a* must have high impedance. In that event a current flows from source PP–1, Load 3, coil 110*a*, coil 111*a*, rectifier 117*b*, Load 2, to ground. If the conditions were the same as just described except that the coil 112*a* likewise had low impedance, the latter coil would in effect constitute a short circuit across Load 2 and prevent current from flowing therethrough. Similarly, in the case of Load 1, when all three coils have low impedance the two coils 111*a* and 112*a* taken together form a short circuit across Load 1 and consequently no current flows in that load.

In the absence of battery 118, currents from source PP–1 flowing through coils 110*a*, 110*b*, 111*a*, 111*b*, 112*a* and 112*b* might induce currents in coils 110*d*, 110*e*, 110*f*, 111*d*, 111*e*, 112*d* and 112*e* which might flow into the input circuit and disturb the operation of the device. This might be especially true in the case of a complete computer or data translating system where the signal sources are more complicated pieces of apparatus than the simple switches shown. In order to prevent any currents induced in the control coils from flowing through the input circuit, the blocking battery 118 is employed and it produces a potential which normally renders the cathodes of rectifiers 119*a* to 119*g* inclusive positive and thus cuts off these rectifiers at all times except when source PP–2 is positive and applies pulses to the coils connected to battery 118.

The over-all operation of the device may now be explained. Assuming that none of switches SS–1 to SS–7 inclusive are closed, on negative half cycles of source PP–1 reverting currents will flow in coils 110*c*, 111*c* and 112*c* to revert all three cores. During the positive half cycles of source PP–1, the currents flowing in coils 110*b*, 111*b* and 112*b* will drive the cores from negative remanence 14 to say point 15 and at the end of the positive excursion of the pulse the core will return to plus remanence 11. Hence, the cores 110, 111 and 112 will all traverse their hysteresis loops without saturation and coils 110*a*, 111*a* and 112*a* will all have high impedance. Hence, there will be no current in any one of the loads.

Assume now that switches SS–1, SS–2 and SS–3 are all closed so that the reverting effect of coil 110*c* is completely cancelled during the negative excursions of source PP–1. It is noted that the positive excursions of source PP–2 occur simultaneously with the negative excursions of source PP–1 and may therefore counteract the reverting effect of the negative pulses of source PP–1. In this case the next positive pulse from source PP–1 will flow through coil 110*a* and drive the core 110 to saturation. Coil 110*a* will have low impedance and a large current flow will pass through Load 3. If coils 111*a* and 112*a* still have high impedance, this large current flow will also flow through Load 1.

If now switches SS–1 to SS–5 inclusive are all closed, but switches SS–6 and SS–7 remain open, the coils on core 110 will operate as stated in the immediately preceding paragraph and the coils on core 111 will operate as follows: The currents in coils 111*d* and 111*e* will cancel the magnetizing force produced by the current in coil 111*c* and the core 111 will not be reverted during the spaces between power pulses. Hence, the next positive power pulse from source PP–1 will find low impedance at coil 111*a* and current will now flow from source PP–1, Load 3, coil 110*a*, whereupon the current will divide, part of it flowing through Load 1 and the remainder through coil 111*a* and Load 2. If now all seven switches are closed, the power windings 110*a*, 111*a* and 112*a* on all three cores will have low impedance and hence Load 1 and Load 2 will be short circuited and all of the current from source PP–1 will flow through Load 3 only.

The following table shows the relationship of the cores to the load. In the following table a high impedance in the core is represented by 0 and low impedance is represented by 1. At the load the "no current" condition is represented by 0 and "output at the load" is represented by 1, thus:

| Cores | | | Load | | |
|---|---|---|---|---|---|
| A | B | C | 1 | 2 | 3 |
| 0 | 0 | 0 | 0 | 0 | 0 |
| 1 | 0 | 0 | 1 | 0 | 1 |
| 1 | 1 | 0 | 1 | 1 | 1 |
| 1 | 1 | 1 | 0 | 0 | 1 |
| 1 | 0 | 1 | 1 | 0 | 1 |
| 0 | 1 | 1 | 0 | 0 | 0 |
| 0 | 0 | 1 | 0 | 0 | 0 |
| 0 | 1 | 0 | 0 | 0 | 0 |

One important aspect of the invention resides in the fact that there are diodes in the principal circuits. For example, in Figure 4 there is a diode 45 in series with the load. This enables the gating circuit to develop large power and energy gains; that is, it is possible to deliver to the load much more power and energy than is supplied by the signal sources SS–1 to SS–4 inclusive. In a series circuit such as Figure 4, only one diode is necessary, while in a circuit such as Figure 7 where there are several branches it is desirable to have one diode in each branch. In general, in all figures the diodes enable the negative-going excursions of the source PP to cut off the diodes and thereby prevent flow of current to the load during the spaces between positive going power pulses. On the other hand, large amplitude positive going power pulses may be employed to supply large amounts of power and energy to the load during those times when there is a low impedance path between the source of power pulses and the load.

In order to illustrate a practical application of the invention, I will illustrate the same as replacing a conventional gate in a modern type of half-adder. The half-adder which I choose to mention in connection with this explanation is the one which is described in U.S. Patent 2,806,648, entitled "Half-Adder for Computing Circuits."

In order to understand the half-adder circuit of U.S. Patent 2,806,648, it is first desirable to explain the operation of a non-complementing magnetic amplifier. A typical non-complementing magnetic amplifier is illustrated in Figure 12 and employs a source 120 producing an uninterrupted train of positive power pulses which are equally spaced and generally the spaces between the pulses are equal to the duration of the pulses. The signal source 27 produces from time to time the control signals and by reason of any suitable means 26, these control signals are always synchronized to appear during spaces between the positive power pulses. When the power pulses from sources 120 are positive they pass through rectifier 121, coil 122, resistor 127 to negative pole 124 which is below ground potential. If we assume that at the start of the first pulse the core was at point 14 on its hysteresis loop (see Figure 1), it will be driven to point 15. At the end of the this pulse, it will return to zero value 11. At the conclusion of the first pulse, current will flow in the following circuit: from ground to rectifier 126, coil 122, resistor 123 to negative pole 124. This is a current flow through coil 122 in the opposite direction from that of the first pulse and drives the core negatively from point 11 to point 13. At the conclusion of this reverse pulse, the second power pulse will again drive the core positively from point 13 through point 14 to point 15, and from thence it will go to 11, after the conclusion of the second pulse. The next action will be another flow of current in the following circuit: from ground, rectifier 126, coil 122, resistor 123, to negative pole 124.

Hence, the magnetization of the core will repeatedly traverse the hysteresis loop and the majority of the time the core will be operating on unsaturated portions of the hysteresis loop, consequently there will be substantially no output. If, however, an input signal is received in coil 125, at a time when the core is at point 11, the reverse current (in circuit: ground 126—122—123—124) will not drive the core negatively to point 13 as usual. In such situation, there will be two opposite magnetizing forces on the core. On the one hand, there will be a flow of current in the circuit: ground to rectifier 126, coil 122, resistor 123, to negative pole 124, tending to apply a negative magnetizing force to the core. There will be an additional input current in coil 125 tending to apply a positive magnetizing force to the core. These two magnetizing forces will cancel each other and the core will remain at point 11 on the hysteresis loop. Consequently, the next power pulse will pass through rectifier 121 and coil 122 to the output. It will drive the core from point 11 to point 12 on the hysteresis loop. The core is substantially saturated throughout this entire period, and therefore a large pulse output will appear. The operation of the non-complementing amplifier may be summarized by stating that the currents will drive the core around the hysteresis loop without substantial saturation and therefore without any substantial pulse output until there is a current flow through coil 125. This will stop the alternating magnetizations of the core, allowing the next power pulse to saturate the core and give a large output.

The source 120 preferably goes negative during the spaces between positive power pulses. In other words, it is a source of square wave alternating current. On the negative half cycle the rectifier 121 is cut off so that reverting current from source 124 will not enter the generator 120 but will flow exclusively through coil 122 and rectifier 126.

Figure 13:
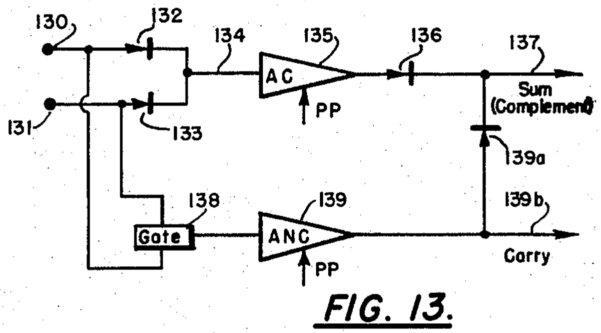
Figure 13 is a block diagram of a half-adder employing a gate. This figure is not part of my invention but is included for purposes of enabling me to point out how one of my novel gates may replace the conventional gate of this circuit.
Figures 14, 16:
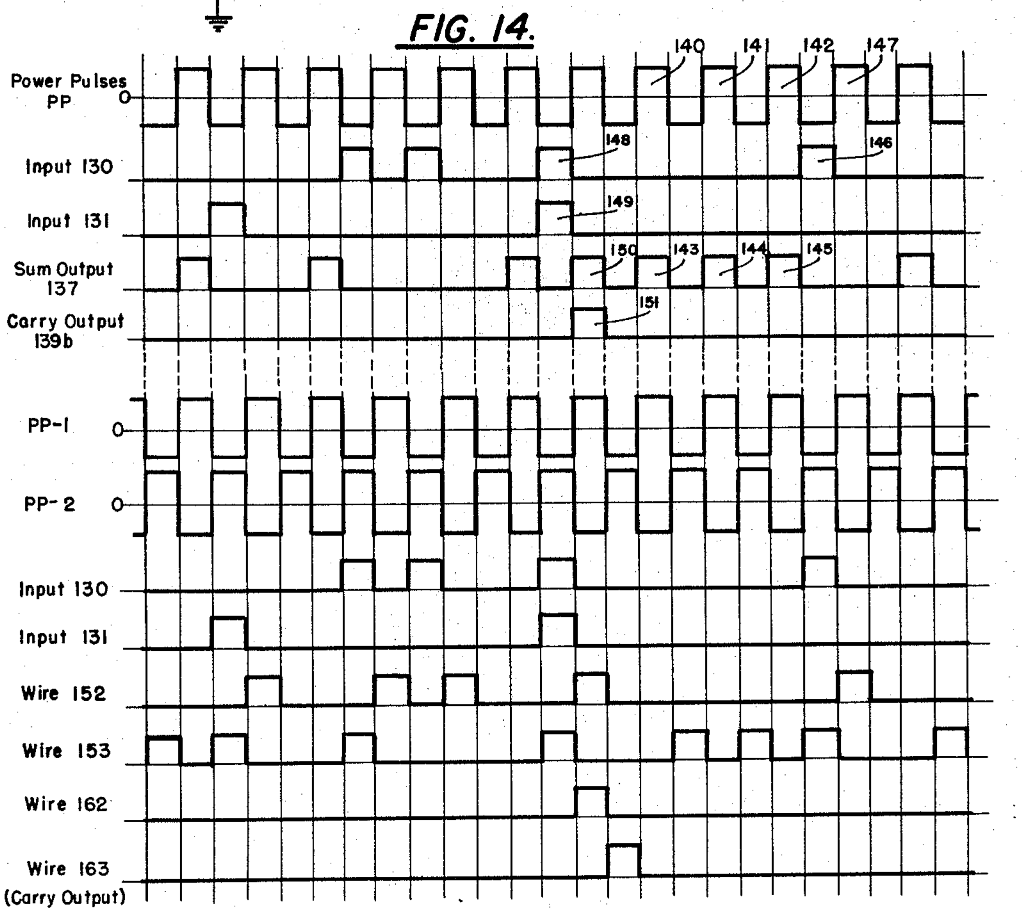
Figure 14 is a waveform diagram of the device of Figure 13.
Figure 16 is a waveform diagram of the device of Figure 15.

Figures 13 and 14 illustrate the half-adder invented by Rutledge as aforesaid, and wherever in the following description of those figures reference is made to a complementing magnetic amplifier, it is understood that such amplifier may be of the type shown in Figure 1 of this application; and wherever reference is made to a non-complementing magnetic amplifier it is understood that the amplifier of Figure 12 may be used.

Referring now to the block diagram of Figure 13, it is noted that the complementing magnetic amplifier 135 passes a continuous series of power pulses PP–1 through buffer 136 to the "sum" output 137, in the absence of a signal on wire 134. The two binary signals to be added, which may have the waveforms shown in Figure 14, are fed onto terminals 130 and 131 from a magnetic store or other element. If there is a signal on either one of these inputs 130 or 131, the next succeeding power pulse from amplifier 135 is interrupted. This is clearly illustrated in Figure 14 where it is noted that power pulses PP–1 occur at 140, 141 and 142 respectively, producing "sum" output pulses at 143, 144 and 145. However, when input pulse 146 occurs at input 130, the next succeeding power pulse 147 does not flow to the "sum" output 137. When input pulses occur simultaneously at input terminals 130 and 131, the diode gate 138 becomes conducting and triggers the non-complementing magnetic amplifier 139 so that the latter allows the next power pulse to flow to the "carry" output **139*b* and to the "sum" output 137. This is clearly illustrated in Figure 14 which shows the inputs 130 and 131 as having received input pulses 148 and 149. These cause a pulse 150 at the "sum" output 137 and a pulse 151 at the "carry" output 139*b***.

It follows from the foregoing that when there is no signal on either input, there will be no signal at the "carry" output **139*b* and there will be a continuous series of power pulses at the "sum" output 137. When there is a pulse on just one of the input terminals 130 and 131, there will be a pulse on wire 134 which will interrupt the next power pulse from amplifier 135 and give an indication in the "sum" output 137 by the absence of a pulse. When there are simultaneous input pulses on both terminals 130 and 131, the amplifier 139 allows the next power pulse to pass to the "carry" output 139*b*, indicating a "carry" digit, and also a pulse passes to the "sum" output 137** indicating the lack of a sum.

The gate 138 of Figure 13 is the important element so far as the present application is concerned, inasmuch as the present application discloses a novel gate which may be substituted for the gate 138 of Figure 13. In Figure 13 the gate 138 produces an output pulse only when there are concurrent input pulses on input wires 130 and 131. In other words, in event there are simultaneous input pulses on wires 130 and 131, the gate will supply an input pulse to amplifier 139. In the aforesaid patent a gate 138 is the conventional diode gate.

Figure 15:
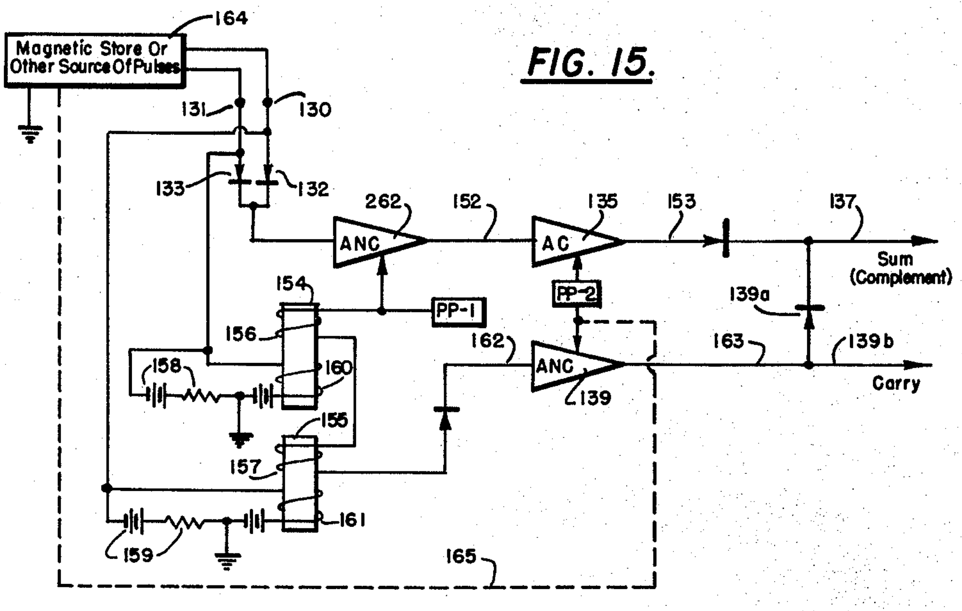
Figure 15 is partly a block and partly a schematic diagram of the half-adder of Figure 13 with my novel gate shown in place of the conventional gate of Figure 13.

Figure 15 is a schematic diagram of the circuit of Figure 13 with the gate of the present invention substituted for the gate 138 of Figure 13.

In connection with Figure 15, those parts which are identical with corresponding parts of Figure 13 bear like reference numbers. There are two generators of power pulses PP–1 and PP–2 which have the waveforms shown in Figure 16. There are also input pulses at inputs 130 and 131, received from the magnetic store, which are for purposes of explanation assumed to be the same and to occur at the same time periods as the input signals 130 and 131 of Figure 14. Whenever input signals are received concurrently on wires 130 and 131, the magnetic gate 154—155 will allow a pulse from source PP–1 to flow to wire 162 and to the input of amplifier 139. In the absence of a pulse on either of inputs 130 or 131, the magnetic gate 154—155 will not allow a pulse to flow from source PP–1 to the wire 162. Normally the core 154 will have high impedance for the reason that it will be reverted during the spaces between positive pulses from source PP–1 due to to the resistor and battery 158. Likewise, during the periods between positive power pulses of source PP–1 the core 155 will be reset due to the battery and resistor 159. Hence, positive power pulses from source PP–1 will not saturate either of cores 154 or 155 in the absence of a pulse on inputs 130 and 131. In event a pulse appears on input 130 alone, the reverting effect of battery 159 will be cancelled and the core 155 will not be reverted during the spaces between positive power pulses of source PP–1. It is only when there are concurrent pulses on both inputs 130 and 131 that the reverting effect upon both of cores 154 and 155 is cancelled and pulses from source PP–1 thereupon allowed to flow to the wire 162.

It is noted that by inserting the magnetic gate of the present invention for a conventional diode gate, the output 162 from the gate is displaced by one time period with respect to the input. Therefore, in order to prevent this from having an adverse effect upon the half-adder circuit, it is necessary to delay the pulses that would normally appear at the input of complementing magnetic amplifier 135 by one time period, and consequently, the non-complementing magnetic amplifier 262 is placed in series with the input 152 of the complementing magnetic amplifier 135. It is clear from the foregoing description that the pulses received on wires 152 and 153 are identical with the pulses received at the inputs of amplifiers 135 and 139 of Figure 13, the only difference being that the pulses in Figure 15 are displaced from those of Figure 13 by one time space. A second source of power pulses PP–2 is therefore employed in connection with amplifiers 135 and 139 of Figure 15 so as to properly amplify the delayed pulses which are received by those amplifiers and as a result, the outputs on wires 137 and **139*b*** of Figure 15 are identical with those on similar wires of Figure 13 except displaced by one time period.

The waveform diagram of Figure 16 clearly shows the relations of pulses in the device of Figure 15, and shows that the mode of operation of Figure 15 is substantially identical with that of Figure 13 except as hereinabove pointed out. In order to visualize the "sum" output of Figure 15, it is merely necessary to add together the pulses appearing on wire 153 of Figure 16 with those appearing on wire 163.

As shown in Figure 15, the source of pulses 164 may be a store or any other source of controlled pulses. If it is a store, it may be of any suitable type, such as the magnetic type, and would have the several binary numbers stored therein in such a way that when the apparatus is in operation the binary signals emerging therefrom will be in the form of pulses appearing during the spaces between the pulses of source PP–1. This is clearly shown in Figure 16 where all of the pulses on inputs 130 and 131 appear during the spaces between pulses of source PP–1.

In event the device 164 is a mechanism other than a magnetic store, so that it is a trigger device which controls the flow of pulses to wires 130 and 131, it would normally be fed through wire 165 with pulses from source PP–2 since the pulses of this source appear during the gaps between the pulses of source PP–1. It is understood that in connection with a complete computing system embodying magnetic amplifiers, the two sources of power pulses PP–1 and PP–2 would normally be present and would supply pulses to a large number of different magnetic devices throughout the entire computer system, consequently each element, such as 164, which might feed the input to the new gating system would normally be fed with power pulses from one of the two sources PP–1 or PP–2 contained in the overall system. In adapting the gate to such a situation, it is merely necessary for the power winding of the gate to be connected to the source of power pulses other than the one which supplies power pulses to the control element of which 164 is an example.

While the invention has been described broadly in connection with figures such as Figure 4, it is understood that it has a wide variety of detailed applications in computer circuits of which Figure 15 is one example. Other examples include use of the new gate in flip-flop circuits, etc. It is my intention to claim the invention not only as a separate element such as is shown in connection with Figure 4, but to claim it in combination with other elements as a part of a computer circuit. Figure 15 is an example of such a combination which involves the novel gating system in a typical relation with other elements of a computer circuit.

Figure 17:
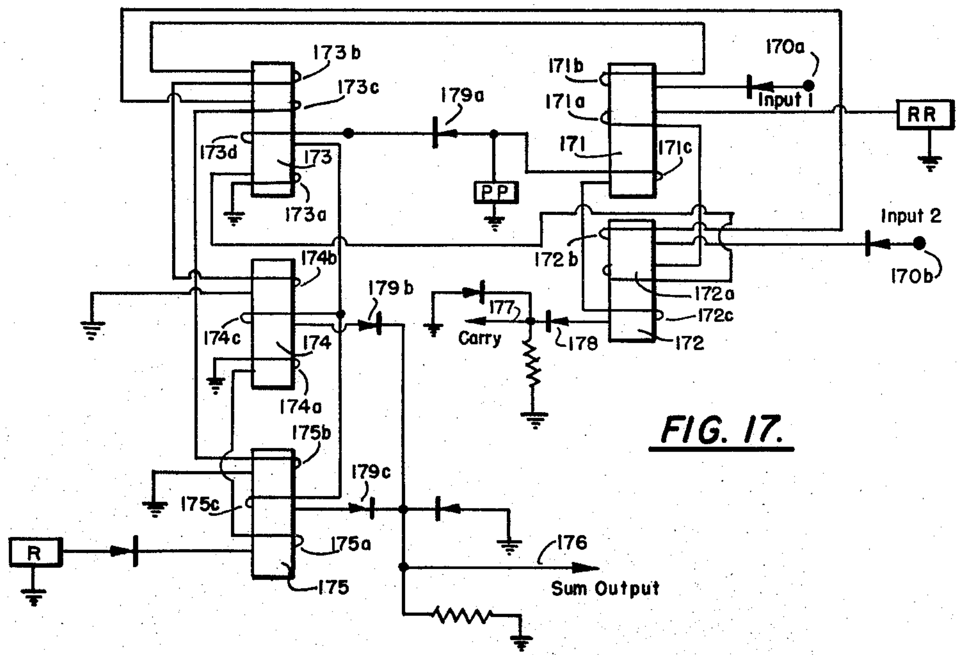
Figure 17 is a schematic diagram of another form of half-adder circuit employing magnetic gating principles herein disclosed.
Figure 18:
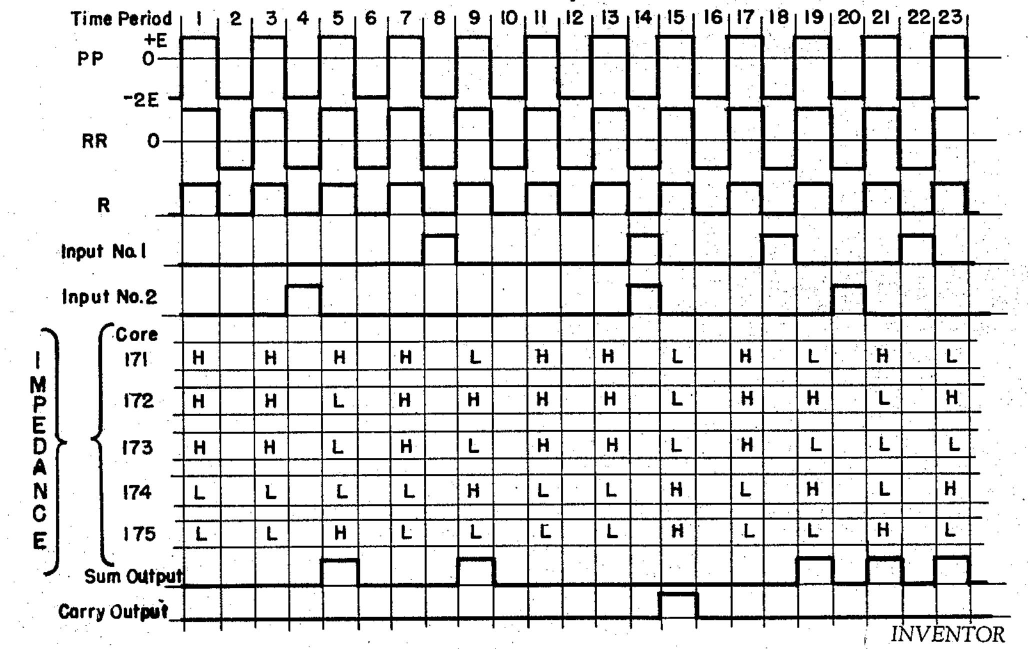
Figure 18 is a timing wave diagram for the half-adder of Figure 17.

Figure 17 illustrates another form of half-adder employing the magnetic gating principles hereinabove described. Figure 18 is a timing wave diagram of the device of Figure 17 and shows the source PP of Figure 17 producing the series of equally spaced alternating current power pulses which go positive during the odd numbered time periods. Preferably, the negative-going excursions have twice the amplitude of the positive-going excursions of this source. Source RR produces reverting and resetting pulses as shown in Figure 18. Source RR produces positive "resetting" pulses concurrently with positive pulses from source PP. There are two inputs **170*a* and 170*b* also referred to as Input #1 and Input #2 for receiving the pulses representing the binary numbers to be added. The cores 171, 172, 173, 174 and 175 are composed of the materials mentioned in connection with the core of Figure 1 and may be of any of the shapes mentioned therein. Cores 171, 172 and 173 form parts of non-complementing magnetic amplifiers in that their cores are normally reverted to point 13** on the hysteresis loop (see Figure 2) during the even numbered time periods by virtue of the negative going portions of the output of source RR.

The source RR also produces positive going pulses during the odd numbered time periods which are additive to the effect of pulses from source PP. The purpose of the positive going or so-called resetting pulses of source RR is that they tend to drive the core from point 14 to point 15 (see Figure 2) during the odd numbered time periods and insure that the positive power pulses will be sufficient to drive the core to saturation if it was not reverted during the periods between positive power pulses. It is noted that cores 171, 172 and 173 are normally reverted by source RR during the even numbered time periods. Hence, in the absence of pulses in the input windings **171*b*, 172*b*, 173*b* and 173*c*, coils 171*c* 172*c* and 173*d* will have high impedance to the flow of pulses from source PP. If, however, there is an input pulse at 170*a*, it will flow through coil 171*b* and 173*b* cancelling the reverting currents in coils 171*a* and 173*a* which will allow coils 171*c* and 173*d* to present low impedance to the next positive power pulse. If there is a pulse at input 170*b*, the current flowing through coil 172*b* will cancel the effect of the reverting current in coil 172*a* and allow the coil 172*c*** to present low impedance to the next positive power pulse from source PP.

As shown in Figure 18, the input pulses always occur during the even numbered time periods whereas the positive pulses from source PP always occur during the odd numbered time periods. This figure also illustrates the effect of the input pulses upon the impedance of the cores 171 to 175 inclusive. The letter "H" represents that the coils on the core have high impedance, and the letter "L" indicates that the coils on the core have low impedance. For example, an input pulse is shown at input **170*a* at time period 8. This causes coil 171*c* on core 171 to have low impedance at time period 9. It is noted that coils on core 171 have high impedance except during the time periods immediately following pulses on the input 170*a*. Likewise, the coils on core 172 have high imjedance at all times except during the time period immediately following an input pulse at input 170*b*. Since core 173 has coils 173*b* and 173*c* respectively in series with inputs 170*a* and 170*b*, current in either input 170*a* or 170*b* will cancel the reverting magnetizing force in core 173 and cause it to have low impedance to the next positive power pulse. Hence, core 173 has low impedance at time periods 9, 15, 19 and 23 due to the pulses appearing at input 170*a* and it has low impedance at time periods 5, 15 and 21 due to the pulses on input 170*b***.

In view of the foregoing, it is possible now to explain the circumstances under which a signal will appear at the carry output 177. Since the device is a half-adder it is desirable that an output appear at the carry output only in event both inputs **170*a* and 170*b* are simultaneously energized. If inputs 170*a* and 170*b* are simultaneously energized, there will be currents flowing in coils 171*b* and 172*b* which will respectively cancel the reverting effect of source RR on cores 171 and 172. Hence, these cores will both have low impedance to the next power pulse. This situation is shown at time periods 14 and 15 of Figure 18. At time period 14 pulses appear at both inputs 170*a* and 170*b* and coils 171*c* and 172*c* both have low impedance during time period 15 which allows the pulse from source PP, which appears during time period 15, to flow through coils 171*c* and 172*c* to the carry output 177**.

It is also axiomatic in a half-adder that when there are inputs at **170*a* and 170*b* concurrently that there should not be a signal at the sum output 176. This is true in the present case since concurrent signals on inputs 170*a* and 170*b* will flow through coils 174*b* and 175*b* respectively. These coils are parts of complementing magnetic amplifiers, that is, there is no reverting current tending to revert these cores during the spaces between power pulses and the coils 174*b* and 175*b* are wound in such direction that current flowing therethrough will tend to revert these cores due to the input current flowing therethrough. Hence, when there are concurrent pulses on inputs 170*a* and 170*b*, the currents resulting therefrom and flowing through coils 174*b* and 175*b*** will revert the cores 174 and 175 to point 13 on their respective hysteresis loops (see Figure 2), and thus cause coils 174c and 175c on these cores to have high impedance to the next positive power pulse from source PP. It is clear that any pulse from source PP must flow through one or the other of coils 174b or 175b in order to reach the sum output 176. As has been explained, when there are concurrent inputs at 170a and 170b, both coils 174c and 175c have high impedance and therefore there is no low impedance path from source PP to the sum output 176 and there will be no signal at that output 176. In a half-adder it is essential that in response to an input signal at only one of the two inputs, that there be no carry output at 177 but there be a sum output at 176. It will now be explained how this occurs. Assume for purposes of illustration, as illustrated at time period 8 of Figure 18, that an input pulse appears at input 170a. It will cancel the reverting effect on core 171 and consequently coil 171c will have low impedance during time period 9. However, since there is no input signal at input 170b during time period 8, the core 172 will be reverted during time period 8 and will cause coil 172c to have high impedance to the flow of pulses from source PP during time period 9, all as illustrated in Figure 18. The core 173 will not be reverted during time period 8 since the input pulse on input 170a will flow through coil 173b and cancel the reverting effect of coil 173a during time period 8. Hence, during time period 9 coil 173d will have low impedance to the power pulse from source PP. As stated before, cores 174 and 175 are parts of complementing magnetic amplifiers and are not reverted during the even numbered time periods unless there is an input current through the input coil, for example, coil 174b. In event there is an input at 170a but no input at 170b, as illustrated at time period 8, of Figure 18, the current in coil 174b will revert the core 174 and cause coil 174c to have high impedance. However, there will be no reverting current in coil 175b which is in series with input 170b and consequently coil 175c will have low impedance during time period 9 and current may readily flow from source PP through coil 173d, coil 175c to the sum output 176. Hence, as shown in Figure 18, there will be a pulse in sum output 176 during time period 9 due to the input signal at 170a during time period 8.

If an input signal appears at input 170b during a time period when there is no input at 170a, as for example at time period 4, the core 171 will be reverted by source RR. Hence, coil 171c will have high impedance and there will be no signal at carry output 177. Core 172 will not be reverted and coil 172c will therefore have low impedance but this is not of controlling importance in this particular situation. Core 173c will not have been reverted since the input signal at 170b flowing through coil 173c will cancel the reverting effect of the current through 173a and therefore the coil 173d will have low impedance. There will be no reverting current in input coil 174b which is fed by input 170a and therefore core 174 will not be reverted during time period 4 and coil 174c will offer low impedance to the flow of current therethrough, during time period 5. Hence, during time period 5 coils 173d and 174c will both have low impedance and therefore pulses from source PP may readily flow through coil 173d, coil 174c to the sum output 176. During time period 4, the input signal at 170b will flow through coil 175b and revert core 175 causing coil 175c to have low impedance but this is not controlling since there is a low impedance path through coil 174c and parallel to the high impedance path 175c and hence power pulses from source PP may readily flow through coils 173d and 174c to the sum output 176.

In event there are no signals at either input 170a or 170b there will be no output at either 176 or 177. This is by reason of the fact that all three of coils 171c, 172c and 173d will have high impedance and will prevent any flow of current from the power source PP. In event there is an input signal at input 170a only, coil 172c will have high impedance preventing a carry output signal and coils 173d and 175c will have low impedance causing a sum output signal at 176. In event there is a signal on input 170b and no signal on input 170a, there will be no carry output signal since coil 171c will have high impedance but there will be a sum output signal since coils 173d and 174c will have low impedance. In event signals appear concurrently on inputs 170a and 170b, currents will flow in both of coils 174b and 175b reverting both cores 174 and 175 and rendering a high impedance path in series with the sum output 176 and preventing any sum output, however, both coils 171c and 172c will have low impedance, thus permitting a carry output at 177.

Therefore, there is a carry output only if there are concurrent signals on both inputs. There is a sum output signal if either of the inputs is alone energized. There is no output at sum output 176 or carry output 177 if both inputs 170a and 170b are de-energized.

The large negative-going excursions of source PP insure that rectifiers 178 and 179a are always cut off during the negative half cycles; hence even though large potentials may be induced in coils 171c, 172c, 173d, 174c and 175c no current will flow.

It is noted that the circuit containing coils 171c and 172c in series with the source of power pulses from the carry output 177 is similar in principle to the gating circuit of Figure 4. It is also noted that the circuit containing coil 173d in series with the source of power pulses PP and the load 176 and also in series with the group of parallel coils 174c and 175c, is similar to the circuit taught in Figure 6 above. It is also noted that rectifiers are employed in series with the principal circuits of the device, for example rectifier 178 in series with the output 177; rectifier 179a in series with the source PP; and rectifiers 179b and 179c in series with the coils 174c and 175c; to allow pulses to flow from the source PP to the loads 176 and 177 but to prevent current induced in the several coils 171c and 172c, 173d, 174c and 175c from flowing in the load circuits, the same as in connection with the previous figures.

Figures 19, 20:
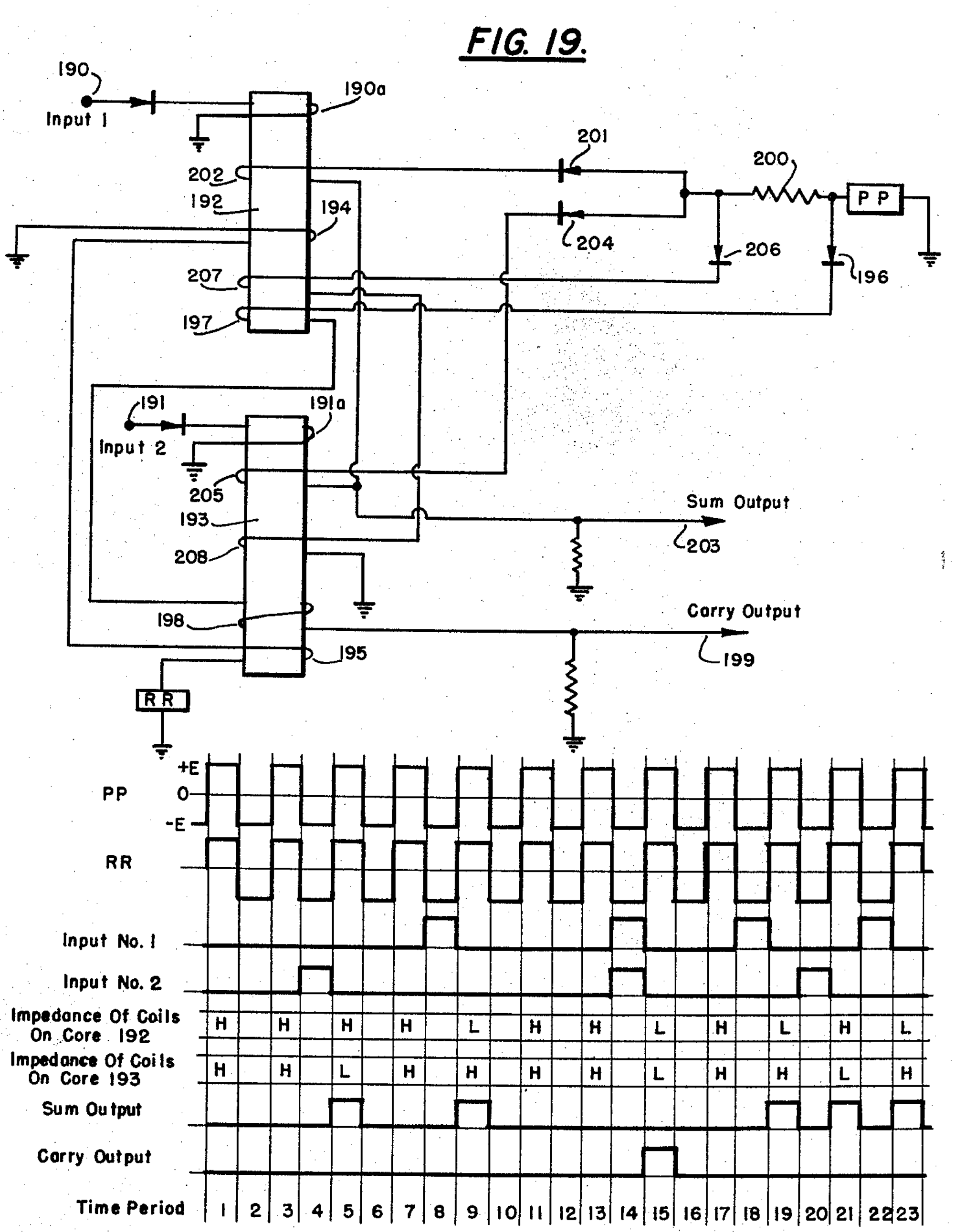
Figure 19 is a schematic diagram of another form of half-adder employing the magnetic gating principles described in this application.
Figure 20 is a timing wave diagram for the half-adder of Figure 19.

Figure 19 illustrates a modified form of half-adder having two inputs 190 and 191 respectively feeding coils 190a and 191a on cores 192 and 193. There is a source of reverting and resetting pulses RR in series with coils 194 and 195. The source RR serves the same purpose as was the case in connection with Figure 17. Pulses from source PP may flow through rectifier 196, coil 197, coil 198, to the carry output 199. The cores are operated on the lines of non-complementing magnetic amplifiers, that is they are reverted during the even time periods (see Figure 20) while the power pulses occur during the odd time periods. The power pulses and the positive going excursions of source RR both tend to drive the cores positively, that is from point 14 to point 15 on the hysteresis loop of Figure 2. The negative excursions of the source RR tend to revert the core during the spaces between positive power pulses, that is, drive it from point 11 to point 13 on the hysteresis loop of Figure 2. The positive going excursions of the source RR are employed in order to insure that the core will be saturated by pulses from source PP in event the core is not reverted during the spaces between pulses of source PP. Input windings 190a and 191a are connected to inputs 190 and 191. In the absence of a pulse at input 190, current from source RR flowing through coil 194 will revert the core 192 to point 13 on the hysteresis loop during the space between positive power pulses of source PP. During the positive half cycle of source RR its pulse, together with any pulse from source PP will tend to drive the core from point 14 to point 15 on the hysteresis loop. In event a pulse from source 190 flowing through its complementary input coil 190a on core 192 occurs during one of the even time periods, for example time period 8, it will cancel the reverting effect of the negative going excursions of source RR and the core will not be reset during the space between power pulses but will remain at point 11 on the hysteresis loop. During the time period 9, the positive going excursion of source RR in addition to the power pulse PP will saturate the core 192 and cause the coils thereof to have low impedance.

Core 193 and its coils operate in the same way as those of 192. That is, source RR produces negative going excursions through coil 195 that normally revert the core but if there is an input pulse at input 191, flowing through the coil 191*a* on core 193, the reverting effect of coil 195 is cancelled and the next positive going excursion of source RR plus the next power pulse will saturate the core 193.

If it now be assumed that pulses representing binary numbers are fed to inputs 190 and 191, as shown in Figure 20, the results will be as follows. Assume that the first pulse to be received on an input will be a pulse at time period 4 arriving at input 191. It will cancel the reverting effect of the negative going excursion of source RR occurring at that same time period so that at time period 5 the coils on core 193 will have low impedance, but the coils on core 192 will have high impedance. Hence, a current may now flow from soure PP through resistor 200, rectifier 204, coil 205, to sum output 203. Hence a pulse appears at the sum output 203 during time period 5. No output will appear at the carry output 199, however, since any current to that output must flow through coils 197 and 198 in series, and as has been stated, at time period 5 the coil 197 has high impedance and therefore no current may flow therethrough to the carry output. The next input pulse to arrive at the apparatus will do so on input 190 at time period 8. It will cancel the effect of the reverting current through coil 194 at that same time period, and consequently the coils on core 192 will have low impedance at time period 9. Since there is no pulse at input 191 during time period 8, the core 193 will be reverted by the reverting pulse flowing through coil 195 and the coils on core 193 will have high impedance at time period 9. It follows that at time period 9 there will be a sum output at 203 by reason of current flowing from source PP, resistor 200, rectifier 201, coil 202 which has low impedance, to sum output 203. There will be no pulse at the carry output for the reason that at time period 9 the coil 198 on core 193 has high impedance and therefore blocks the flow of any current to the carry output 199. No further pulses occur until time period 14 at which time input pulses occur on both inputs 190 and 191. Hence, the reverting magnetizing forces in both cores 192 and 193 are cancelled at time period 14 and consequently the next power pulse at time period 15 will add to the positive excursion of source RR at time period 15, and will drive both cores to saturation and all of the coils on both cores will have low impedance. Consequently, coils 197 and 198 have low impedance and therefore a pulse at time period 15 may readily flow through rectifier 196, coil 197, coil 198 to carry output 199. Moreover, coils 207 and 208 have low impedance and therefore the lefthand end of resistor 200 is effectively grounded through rectifier 206, coil 207, and coil 208. Since the lefthand end of resistor 200 is effectively grounded, all of the potential of the power pulse at time period 15 will appear across resistor 200 and substantially no current will flow through rectifiers 201 and 204 and coils 202 and 205 to the sum output 203. Hence, no current will appear at the sum output. Additional pulses are shown appearing at input 190 at time periods 18 and 22. These have the same effect as the pulse which appeared at input 190 at time period 8. Another pulse is shown as appearing at input 191 at time period 20 and has the same effect as the pulse which appeared at time period 4.

The half-adder circuit of Figure 19 is a practical illustration of several of the magnetic gating circuits hereinabove disclosed. For example, the carry output circuit from source PP through rectifier 196, coil 197, coil 198 to the output 199 illustrates the series type of gating circuit described in detail in connection with Figures 4 and 5. The sum output circuit involving parallel coils 202 and 205, with that group of parallel coils being in series with the source of power pulses PP and the load 203 is similar to the gating circuit of Figure 7. The coils 207 and 208 being arranged so then when they have low impedance they will shunt current from the source of power pulses to ground and prevent it from flowing through the load, is analogous to some of the circuitry of Figure 11 where there is shown coil 112*a* in parallel with Load 2 and which short circuits the load and prevents current flow therein when the coil 112*a* on the core 112 has low impedance.

Another feature of the invention is that the cores may have a plurality of input windings or a plurality of output windings or both. Figure 11 shows the situation where there are a plurality of input windings on the same core. It is understood that in such a case the signal sources energizing these plural windings may be diverse circuits in an electronic computer. Figures 17 and 19 illustrate plural power windings on the same core. For example, in Figure 17 the power windings 173*a* and 173*d* are in different electrical circuits. Likewise, in Figure 19 the power coils 194, 197 and 207 are on the same core but are in different circuits. It is understood that such plural input or output windings may be arranged in any desired way. For example, there may be a plurality of series-parallel circuits such as Figure 6 and one core may be common to all the circuits with a coil on the core for each circuit respectively.

Figure 21:
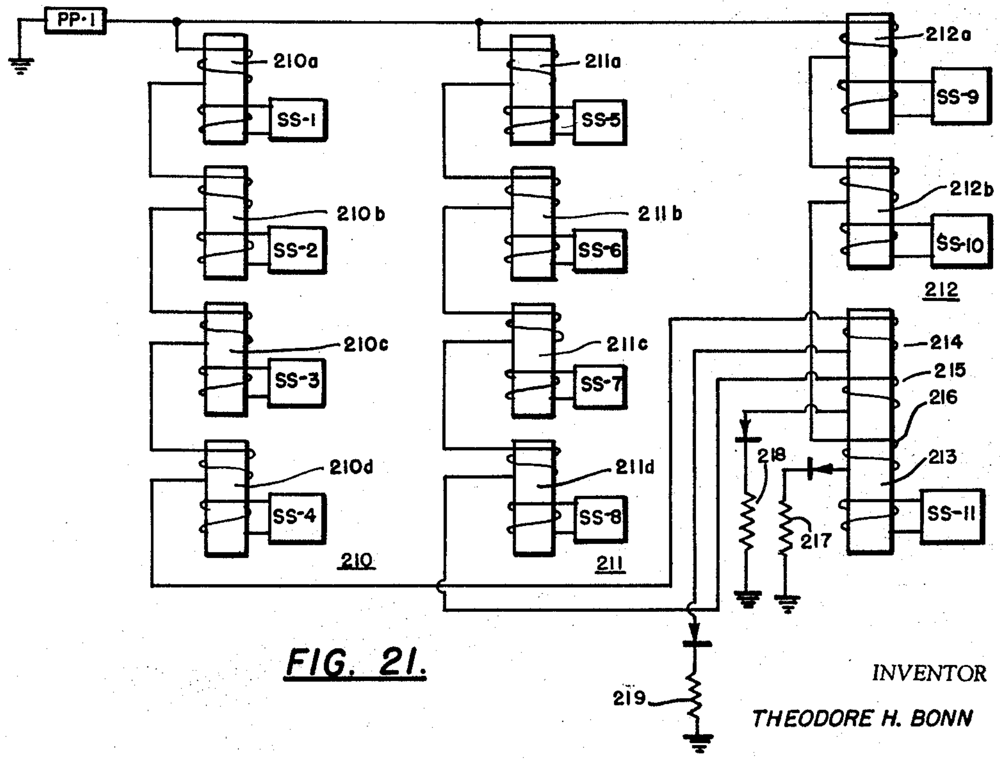
Figure 21 is a schematic diagram of a modified form of the invention.

Figure 21 is a schematic diagram of a further modified form of the invention showing how various gating circuits may be interconnected. This gating circuit is illustrative of a basic principle which may be embodied in a radically new and improved type of computing or data translating system.

Early computers involved vacuum tube circuits. Later computing and data translating systems have been developed employing, as their principal components, magnetic amplifiers of the general type shown in Figures 1 and 12. This invention provides gating circuits which may be interconnected with each other to form a computing or data translating system. In carrying out this latter principle, the several cores may have a plurality of power windings on them which are interconnected in various ways to perform the computing or data translating functions.

Figure 21 is an illustration of a system of magnetic gating circuits. In Figure 21 there is a first complete gating system similar to that of Figure 4 and employing cores 210*a* to 210*d* inclusive. Another gating system similar to Figure 4 employs cores 211*a* to 211*d* inclusive. Still another gating system identical with Figure 4 may employ cores 212*a* and 212*b*, except only two cores are used in this case for purposes of illustration. In all three of the gating systems just mentioned the power circuit includes source PP–1 and each gating circuit has it output passing through a coil on core 213. For example, gating circuit 210 has its power circuit in series with coil 214 on core 213 and in series with load 219. Similarly gating circuit 211 has its output in series with coil 215 and load 218. Similarly, gating circuit 212 has its power winding in series with coil 216 and load 217. As a result, the single core 213, by having a plurality of coils respectively connected in the several gating circuits, may control the outputs of all three gating circuits; and if core 213 is reverted so that it has high impedance to a given power pulse, there will be no outputs in any of the loads 217, 218 and 219 even though all the signal sources SS–1 to SS–10 inclusive are in such condition that all of the gates 210 to 212 inclusive have low impedance.

On the other hand, if signal source SS–11 is in such condition that there is no reverting flux for the core 213, coils 214, 215 and 216 will have low impedance and will allow current to flow through as many of the gates 210, 211 or 212 as have low impedance to the loads 217, 218 and 219.

In carrying out the invention of Figure 21 it is assumed that suitable setting means may be provided on all of the cores to set them at point 11 of their respective hysteresis loops at the end of each positive power pulse of source PP–1. Such means are shown in Figure 5 in the form of coils 59*a* to 59*d* inclusive.

I claim to have invented:

1. A gate for an electrical circuit comprising a load circuit having at least one load, a plurality of magnetic amplifiers each having a core of magnetic material that is characterized by a substantially rectangular hysteresis loop, a power winding on each core, means connecting said power winding only on each of said cores to said load circuit and a source of power, means whereby spaced pulse energy flows in the load circuit, and means independent of said load circuit whereby the flux density and magnetizing forces on the cores are so determined prior to each pulse that the desired gating effect is achieved.

2. An electrical circuit comprising a load circuit including a load, a plurality of magnetic amplifiers the cores of which are composed of material having a substantially rectangular hysteresis loop, each amplifier having a power winding, a single one of said power windings of each of said amplifiers connected in series with said circuit, a source of spaced pulses connected to said circuit, and means independent of said load circuit which during the spaces between pulses may so set the cores as to determine the impedances of said power windings to the flow of current therethrough.

3. An electrical circuit comprising a load circuit, means including a plurality of magnetic amplifiers each having a single power winding only connected to said load circuit whereby changes in said amplifiers will control the current in the load circuit, a source of spaced pulses of electrical energy connected to said load circuit whereby the resulting current in said load circuit is subject to the controlling effect of said magnetic amplifiers, and control means independent of said load circuit connected to said magnetic amplifiers and operative only during the spaces between pulses to so set the magnetic amplifiers that they will have the desired controlling effect upon the current in the load circuit.

4. An electrical circuit comprising a source of spaced pulses, a load, a plurality of magnetic amplifiers having cores characterized by a substantially square hysteresis loop, a power winding on each core, said source of pulses being connected in series circuit with a single power winding of each of said magnetic amplifiers and the load, a control winding independent of said series circuit on each core, and control means for selectively energizing the control windings during the spaces between pulses to so condition the cores that they will have the desired controlling effect on the pulses tending to flow to the load.

5. An electrical circuit comprising a source of spaced pulses, a plurality of magnetic amplifiers having cores characterized by substantially rectangular hysteresis loops, a power winding on each core, said power windings being shunted across each other, a circuit including a load in series with said source and also in series with the group of power windings that are shunted across each other, control windings on the cores, and control means for selectively energizing the control windings during the spaces between pulses to so condition the cores that they have a selective controlling effect on the flow of pulsed energy.

6. An electrical circuit comprising a load; a plurality of magnetic amplifiers having cores characterized by substantially square hysteresis loops; power winding on each core, said windings being in series with the load and with each other; an alternating current source of power pulses in series with said windings and the load; rectifier means in series with the load, said windings and said source; a second source which produces pulses during the gaps between positive pulses of the first-named source; a control winding on each core; core reverting means for energizing the control windings during the spaces between positive pulses of the first-named source so as to condition the cores and determine the output at the load; and control means for selectively energizing said control windings with pulses from the second source with such polarity and amplitude as to cancel the effect of the core reverting means and thereby control the flow of current from the first source to the load; said alternating current source having negative-going excursions that cut off said rectifier and thus prevent flow of current in the load circuit during the spaces between positive pulses of the first-named source.

7. A gating circuit comprising a source of spaced pulses, a load in series with said source, and gating means including all of the following parts: at least three magnetic amplifiers having cores characterized by substantially rectangular hysteresis loops, power windings respectively on said cores, said power windings being connected in series with each other and with said source and said load, output leads respectively connected to the ends of the power windings that are connected to other power windings, means for selectively applying magnetizing forces to said cores during the spaces between pulses to respectively condition them for the pulses whereby the different output leads receive energizations depending on the conditioning of the several cores.

8. A gating circuit as defined in claim 7 in which the last-named means comprises a plurality of control windings on each of the cores.

9. An electrical circuit as defined in claim 8 in which the control windings apply magnetizing forces to the core in opposite sense to the magnetizing forces of the pulses, the circuits of the power windings having such low impedances that if any power pulse is not preceded by control energizations in all of the control windings then substantially maximum pulse energy will flow from the source to the load.

10. An electrical circuit having a load circuit comprising a plurality of magnetic amplifiers each including a core having a rectangular loop hysteresis characteristic, a single power winding, a control winding independent of said load circuit for selectively altering the magnetization of said cores, alternating current source means for energizing said control winding during one half cycle of said alternating current source whereby current flows in the load circuit during the other half cycle subject to the controlling effect of said magnetization; and rectifier means in the circuit to block current flow through the load during the other half cycle.

11. An electrical circuit having a load, a source of spaced power pulses in series with the load, means for controlling the flow of said power pulses to the load comprising a plurality of magnetic amplifiers each having separate power windings, only one of said power windings of each of said amplifiers carrying current from the source to the load, each of said magnetic amplifiers having a saturable core and a control winding independent of said power windings operable to determine whether or not the core is reverted during the spaces between said power pulses, and separate signal sources for respectively energizing said control windings during the spaces between power pulses.

12. An electrical circuit as defined in claim 11 in which all of said power windings are in series with each other as well as in series with the source of power pulses and the load.

13. An electrical circuit as defined in claim 12 including means connected to the load for cancelling the sneak currents for all of said magnetic amplifiers.

14. An electrical circuit as defined in claim 11 in which all of said power windings are in parallel with each other, and the group of parallel power windings being in series with said source and the load.

15. An electrical circuit as defined in claim 14 having means connected to the load to cancel the sneak currents passing through said power windings to the load when all of the power windings concurrently have high impedance.

16. An electrical circuit as defined in claim 11 in which a first power winding is in series with the load so that all current from said source to the load must flow through that winding and a plurality of said windings being connected in branch circuits that are in parallel with each other, the group of branch circuits being connected in series with the load, whereby current will not flow to the load unless said first power winding as well as all the power windings in at least one of said branches has low impedance.

17. An electrical circuit as defined in claim 11 in which at least a portion of the circuit from the source to the load includes parallel branches with at least one of said power windings in each branch, and one of the branches comprising at least two of said power windings in series with each other.

18. An electrical circuit comprising a load, means including a plurality of magnetic amplifiers each including a single power winding connected in series with the load independent of other power windings of corresponding amplifiers whereby an unsaturated core in one of the amplifiers will present a high impedance to any flow of current to the load, each of said amplifiers having a control winding independent of said power windings, input means for energizing and de-energizing the control windings so as to determine the impedance of the power windings, generator means whereby spaced pulses are caused to flow in the load circuit subject to the controlling effect of said magnetic amplifiers, and a rectifier in series with the load to allow said pulses to flow to the load but to prevent flow to the load of current induced in the power windings during the spaces between pulses.

19. An electrical circuit as defined in claim 18 in which said generator means produces alternating current the positive pulses of which constitute said spaced pulses and the negative pulses of which overcome any surges induced in said power windings and cut-off said rectifier to thereby preclude flow of current to the load during the spaces between power pulses.

20. An electrical circuit comprising a source of spaced pulses, a load, a plurality of magnetic amplifiers having cores characterized by a substantially square hysteresis loop, a power winding on each core, said source of pulses being connected in series with the power windings and the load, a control winding on each core, control means for selectively energizing the control windings during the spaces between pulses to so condition the cores that they will have a corresponding selective controlling effect on the pulses tending to flow to the load, and means tending to drive each core toward saturation even in the absence of flow of said pulses through the power windings so that even if all cores are in a reverted condition they will be driven close to saturation during the time interval of the next pulse from said source, said last-named means and the pulses producing additive magnetomotive forces.

21. An electrical circuit as defined in claim 20, in which the last-named means includes a coil on each core and high resistance means for energizing these coils from said source of pulses; and a rectifier in series with the load, said source being an alternating current source that cuts off said rectifier during the spaces between said pulses.

22. An electrical circuit as defined in claim 20 including means in series with the load for allowing pulses of one polarity to pass from the source to the load when the power windings have low impedance but which blocks flow of all current induced in said power windings so that none of that induced current will flow to the load.

23. An electrical circuit as defined in claim 22 in which said means is a rectifier and the electrical circuit includes means whereby the rectifier is cut off during the spaces between said pulses of said one polarity.

24. An electrical circuit as defined in claim 20 including means in series with the load for allowing pulses of one polarity to pass from the source to the load when the power windings have low impedance but which blocks flow of all current induced in said power windings so that none of that induced current will flow to the load during the spaces between said pulses of one polarity, the additive effects of the pulse currents in the power windings and of the last-named means being insufficient to saturate the cores if they were reverted between power pulses but is sufficient to saturate the cores if following reversion of all cores two power pulses appear without reversion of the cores during the spaces between pulses.

25. A gate for an electrical circuit comprising a load, a plurality of cores, a power winding on each core, said windings being in series with the load and with each other, pulse generator means for energizing said power windings and the load with spaced pulses, a control winding on each core, means for energizing the control windings in the spaces between pulses so as to condition the cores and determine the output at the load, and means to prevent the flow of sneak currents to the load.

26. The device of claim 25 in which said last-named means includes a rectifier, a resistor and a source of potential connected to the load circuit and arranged to cancel any current flow to the load unless it exceeds the value that sneak currents would have.

27. The device of claim 25 in which the last-named means includes a coil on at least one core and means connecting that coil to the pulse generator means to produce a current flow in the coil which tends to cancel sneak currents.

28. An electrical circuit comprising a load, a source of spaced power pulses, a magnetic amplifier having a power winding in series with said source and said load, and another magnetic amplifier having a power winding shunted across the load whereby when the last-named power winding has low impedance the current from said source is shunted around the load, said magnetic amplifiers having control windings for controlling the same during the spaces between said pulses.

29. An electrical circuit comprising first and second loads, a source of spaced power pulses, a first magnetic amplifier having a power winding in series with the source and both of said loads, second and third magnetic amplifiers having power windings in series with each other and these two power windings taken together being shunted across the first load and the power winding of the third magnetic amplifier being shunted across the second load, each of said magnetic amplifiers having control windings for controlling the impedance of said power windings.

30. An electrical circuit as defined in claim 29 having a third load in series with said source and outside the shunting paths of the power windings of the second and third power windings.

31. An electrical circuit comprising a source of alternating current pulses, a rectifier, a plurality of magnetic amplifiers each having a core and a power winding on the core, a load, means connecting said source, said rectifier and said power windings in series, control means for controlling the reverting of said cores during those half cycles of said source in which current does not tend to flow through said rectifier, and means for supplying magnetizing forces to the cores during the period during which the current from said source flows through said rectifier which magnetizing force is additive to that due to flow of current from the source through said power windings so as to insure that if two pulses pass through said power windings without the core being reverted in the space between pulses the cores will be driven to saturation even though the cores were all reverted prior to the first of said two pulses, the source having sufficient potential on those half cycles when current does not flow through the rectifier to cut off the rectifier and prevent flow to the load of any currents induced in the power windings.

32. An electrical circuit as defined in claim 31 in which the last-named means effects induction of enough potential in said power windings when one of the latter has high impedance so as to cancel sneak currents in addition to the function of resetting the core.

33. A gating circuit having gain comprising a plurality of magnetic amplifiers each having a core with a power winding thereon, a load, a rectifier, said power windings being connected in series with each other and with the load as well as with said rectifier, means tending to force spaced pulses through said series circuit and for cutting off said rectifier during the spaces between pulses to prevent any current induced in the power windings from flowing to the load, means normally tending to revert the cores away from a given saturation region of their hysteresis loops during the spaces between pulses, a reset coil on each core, said first-named means including means which concurrently with said spaced pulses forces constant current through said reset coils tending to drive the cores toward the region of saturation to thus cancel sneak currents if one or more of the cores were reverted during the preceding space between pulses and to insure that all cores are driven to saturation by a power pulse if none of them were reverted during the immediately preceding space between pulses, and control means for controlling the reverting of the cores, said gating circuit having greater power output than power input to the control means.

34. In a system of magnetic gating circuits, a first load, a second load, a first group of magnetic amplifiers each having a control winding and a power winding, a second group of magnetic amplifiers each having a control winding and a power winding, and an additional magnetic amplifier having a core with first and second power windings thereon and a control winding, means connecting all the power windings of the first group of magnetic amplifiers in series with each other as well as in series with the first power winding of said additional core and with the first load, means connecting all the power windings of the second group of magnetic amplifiers in series with each other as well as in series with the second power winding of said additional core and with the second load, and a source of spaced pulses in series with both of said series circuits.

35. An electrical circuit comprising a plurality of magnetic amplifiers, said magnetic amplifiers each separately including a saturable core, a plurality of power windings, and a control winding, means for selectively energizing said control windings to predetermine the magnetization of said cores, a first load circuit, a source of power, means connecting a plurality of said power windings with not more than one power winding from each of said amplifiers to said load circuit and to said source of power in the same series circuit to allow current flow in said load circuit in accordance with said selective energization of said control windings, a second load circuit connected to said power by way of others of said power windings connected combinatorially, said other power windings being parts of the same magnetic amplifiers as certain ones of said plurality of power windings.

36. A magnetic gating circuit comprising a plurality of saturable magnetic elements each being substantially saturated at remanence, separate power windings linked to said elements, a source of periodic power pulses of alternating voltage, a load, rectifier means, means connecting one only of said power windings on each of said elements, said source, said load, and said rectifier means in the same series circuit, those of said power pulses of one polarity being passed by said rectifier means and being of sufficient amplitude to drive all said elements to substantial saturation in one direction, separate input means including windings for said elements for selectively driving said elements out of saturation in said one direction so that the associated ones of said power windings present high impedances to said one polarity power pulses, said input means being operative during the other polarity power pulses, said other polarity power pulses being sufficient to cut off said rectifier means during the operation of said input means and said series circuit being such that a power pulse is applied to said load when no one of said power windings has a high impedance during said one polarity power pulses.

37. A magnetic gating circuit comprising a plurality of magnetic amplifiers; each of said amplifiers having a core characterized by a substantially square hysteresis loop, a control winding and a power winding on each of said cores; a plurality of individual control means for selectively energizing said control windings of said amplifiers at spaced intervals to set selected ones of said cores to a particular remanent state and thereby control the impedance states of said power windings; a power source generating power pulses at times during said spaced intervals; a load; and means connecting said power source, one only of the said power windings on each of said cores, and said load in a series circuit independent of said control windings so that the impedance of said power windings to the flow of said power pulses to said load is dependent upon the setting of selected ones of said cores to said particular remanent state, said series circuit relationship being such that a certain signal is supplied to said load when and only when said power windings coincidently have the same impedance states.

38. A magnetic gating circuit comprising a plurality of magnetic amplifiers; each of said amplifiers having a core characterized by a substantially square hysteresis loop, a control winding and a power winding on each of said cores; a plurality of individual control means for selectively energizing said control windings of said amplifiers at spaced intervals to set selected ones of said cores to a particular remanent state and thereby individually control the impedance states of each of said power windings; a power source generating power pulses at times during said spaced intervals; a load; and means connecting said power source, one only of the said power windings on each of said cores, and said load in circuit connection so that a plurality of said power windings are connected in parallel circuit combination with each other, said parallel combination being in series circuit with another of said power windings for current flow from said source through said power windings to said load in dependence upon the setting of selected ones of said cores to said particular remanent state.

39. A magnetic gating circuit comprising a plurality of saturable magnetic elements each being substantially saturated at remanence, separate power windings linked to said elements, a source of periodic power pulses of alternating voltage, a load rectifier means, means connecting a plurality of said power windings, said source, said load, and said rectifier means in the same series circuit, another of said power windings being connected in a series circuit with said source and said rectifier means and in parallel with at least one of said plurality of said power windings, those of said power pulses of one polarity being passed by said rectifier means and being of sufficient amplitude to drive all said elements to substantially saturation in one direction, separate input means including windings for said elements for selectively driving said elements out of saturation in said one direction so that the associated ones of said power windings present high impedances to said one polarity power pulses, said input means being operative during the other polarity pulses, said other polarity pulses being sufficient to cutoff said rectifier means during the operation of said input means.

References Cited in the file of this patent

UNITED STATES PATENTS

| | | |
|---|---|---|
| 2,666,151 | Rajchman et al. | Jan. 12, 1954 |
| 2,681,181 | Spencer | June 15, 1954 |
| 2,682,615 | Sziklai et al. | June 29, 1954 |
| 2,683,819 | Rey | July 13, 1954 |
| 2,685,653 | Orr et al. | Aug. 3, 1954 |
| 2,696,347 | Lo | Dec. 7, 1954 |
| 2,719,773 | Karnaugh | Oct. 4, 1955 |
| 2,729,807 | Paivinen | Jan. 3, 1956 |
| 2,758,221 | Williams | Aug. 7, 1956 |
| 2,766,388 | Wulfing | Oct. 9, 1956 |

UNITED STATES PATENT OFFICE
CERTIFICATION OF CORRECTION

Patent No. 2,959,684 November 8, 1960

Theodore H. Bonn

It is hereby certified that error appears in the above numbered patent requiring correction and that the said Letters Patent should read as corrected below.

Column 1, line 33, after "computing" insert -- or --; column 10, line 50, for "pluses" read -- pulses --; column 14, line 57, for "sources" read -- source --; column 22, line 10, for "then" read -- that --.

Signed and sealed this 30th day of May 1961.

(SEAL)
Attest:

ERNEST W. SWIDER
Attesting Officer

DAVID L. LADD
Commissioner of Patents